United States Patent [19]

Lieberam

[11] Patent Number: 5,393,498
[45] Date of Patent: * Feb. 28, 1995

[54] CONDENSER COOLING AND TEMPERATURE CONTROL SYSTEM

[76] Inventor: Kai Lieberam, 1307 Countryside Pl., Smyrna, Ga. 30080

[*] Notice: The portion of the term of this patent subsequent to Oct. 13, 2003 has been disclaimed.

[21] Appl. No.: 479,194

[22] Filed: Feb. 13, 1990

Related U.S. Application Data

[63] Continuation of Ser. No. 311,290, Feb. 16, 1989, abandoned.

[51] Int. Cl.$^6$ ............... G05D 16/04; C08F 2/10
[52] U.S. Cl. ................... 422/112; 422/138; 526/61; 526/67
[58] Field of Search ............... 422/138, 112, 169, 235; 526/61, 64, 67–70

[56] References Cited

U.S. PATENT DOCUMENTS

| | | | |
|---|---|---|---|
| 4,024,329 | 5/1977 | Lauer et al. | 526/67 X |
| 4,408,024 | 10/1983 | Matsuyama et al. | 422/138 X |
| 4,438,073 | 3/1984 | Kubo et al. | 422/138 X |
| 4,640,963 | 2/1987 | Kreider et al. | 526/67 |

Primary Examiner—Robert J. Warden
Assistant Examiner—Jeffrey R. Snay

[57] ABSTRACT

An improved condenser system for condensing the by-product of resin cooking processes to minimize contamination of the condenser system by entrained liquid resin particles and to increase the efficiency of resin processing systems, including means for efficiently extracting particles from the vapor produced during processing and cool-down of the liquid and returning said particles to the processing container without fouling the condenser system or losing product. The system also includes design improvements and operation improvements for increasing the efficiency, safety and reliability of the condenser system used in the process of cooling and controlling the processing container.

5 Claims, 15 Drawing Sheets

"CONDENSER SYSTEM"

(EXCEPT PRESSURE MEASUREMENT)

"THE CHAIN"

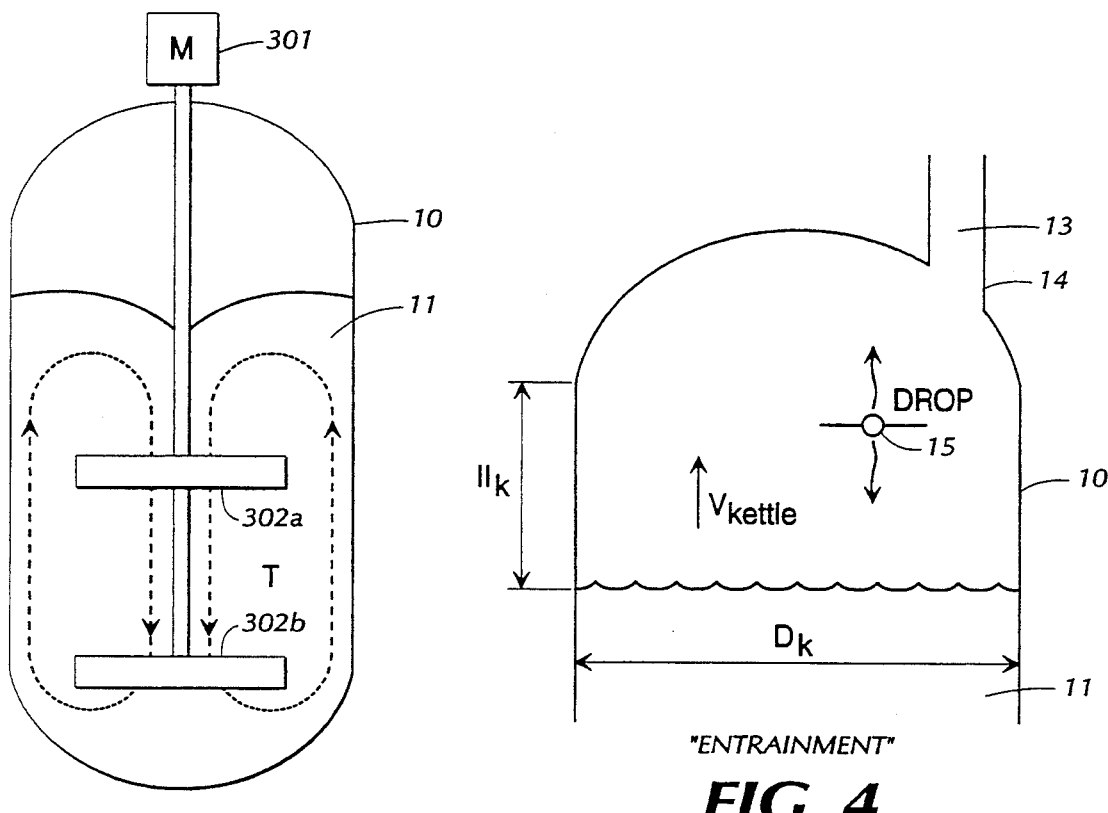
"AGITATION"
FIG. 3
(PRIOR ART)
"ENTRAINMENT"
FIG. 4
(PRIOR ART)
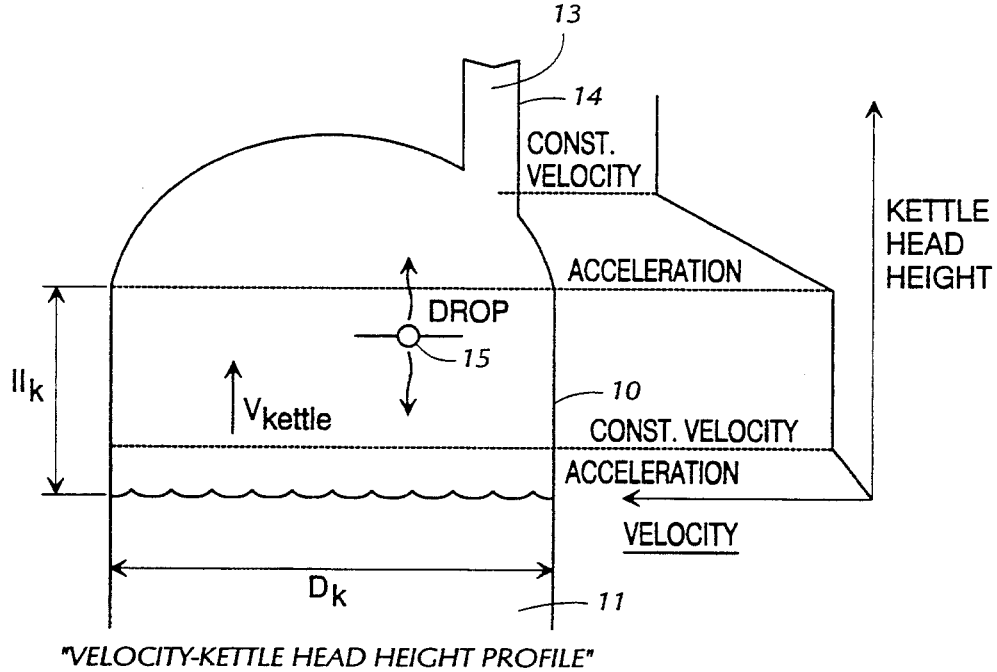
"VELOCITY-KETTLE HEAD HEIGHT PROFILE"
FIG. 5
(PRIOR ART)

"VAPOR-RECOVERY-LINE"

"CONDENSER"

"COOLING-WATER-SYSTEM"

"VACUUM SYSTEM"
IMPROVED PRESSURE
MEASUREMENT SYSTEM

"PRESSURE BEHAVIOR
OF THE REFLUX LINE"

"REFLUX LINE LEADS
INTO LIQUID"

"REFLUX LINE WITH A PUMP INSTALLATION"

"DISTURBANCE OF THE SURFACE-BOILING"

"REFLUX LINE LEADS INTO LIQUID"

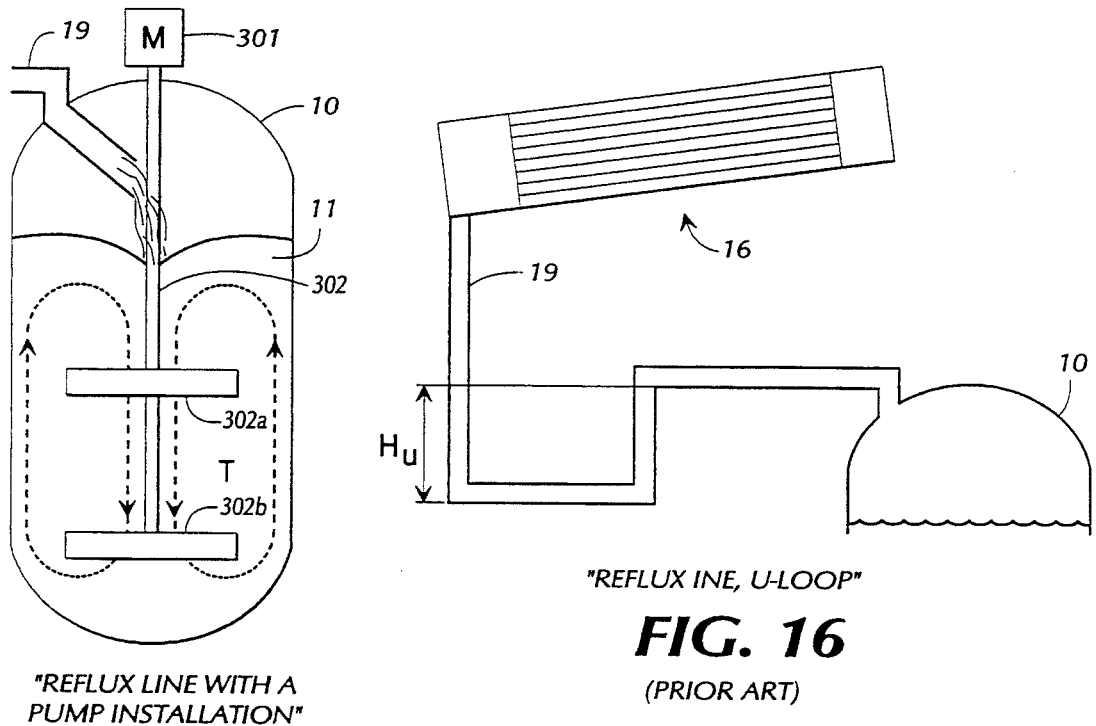
"REFLUX LINE WITH A PUMP INSTALLATION"
FIG. 15
"REFLUX INE, U-LOOP"
FIG. 16
(PRIOR ART)
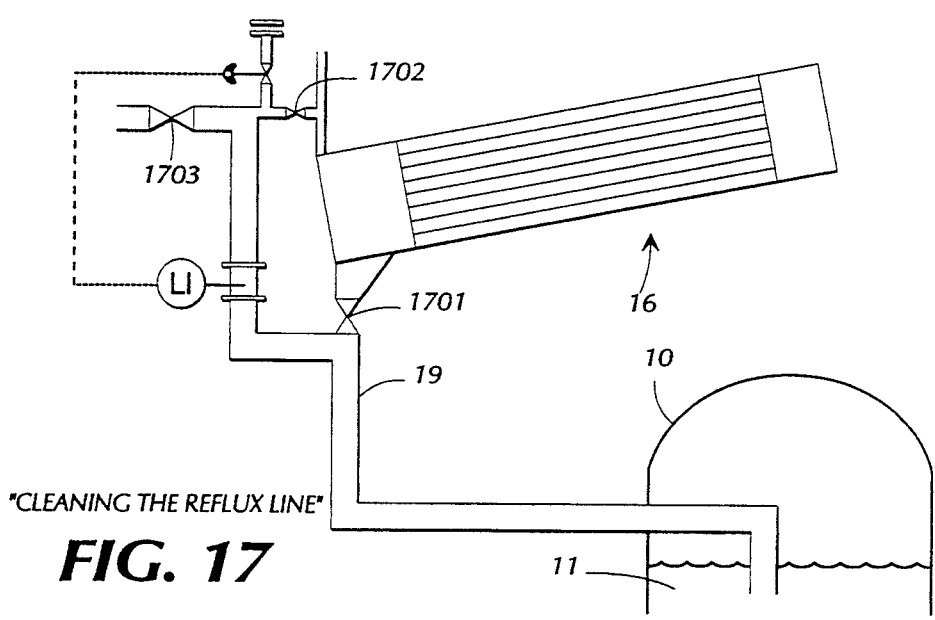
"CLEANING THE REFLUX LINE"
FIG. 17

"FLOODING THE CONDENSER"

"PREVENTION OF CONDENSER FLOODING"

"PREVENTION OF CONDENSER FLOODING"

"REFLUX COLLECTOR"

"PRESSURE BEHAVIOR OF THE CONDENSER SYSTEM"

"REFLUX LINE AT A RUN-AWAY-REACTION"

*"THE CYCLONE"*

*"INSTALLATION OF THE CYCLONE WITH THE LOW- AND HIGH TEMPERATURE SEQUENCE"*

*"LOW- AND HIGH TEMPERATURE SEQUENCE"*

"VELOCITY-KETTLE HEAD HEIGHT PROFILE"

"IMPROVED ENTRAINMENT PROPOSAL WITH THE CYCLONE AND THE KETTLE HEAD HEIGHT"

"REFLUX LINE AT EXISTING KETTLES"

"DISTURBANCE OF THE SURFACE-BOILING"

"TRAFFIC PROBLEM AT THE ENTRANCE OF THE REFLUX LINE"

"ΔP-OPERATION"

"OPTIMUM PRESSURE-TEMPERATURE-PROFILE FOR EACH KETTLE"

"AUTOMATIC PREVENTION OF CONDENSER FLOODING"

"MANUAL PREVENTION OF CONDENSER FLOODING"

CONDENSER COOLING AND TEMPERATURE CONTROL SYSTEM

This application is a continuation of application Ser. No. 07/311,290, filed Feb. 16, 1989, abandoned.

BACKGROUND OF THE INVENTION

The main problem in processing manufacturing resins is to control the temperature of the processing container, especially in the case of strong exothermic reactions present in processing P/F resin. In the case of processing resin, for example, in the past the prior art has not always had sufficient cooling capacity in their condensers to control the exothermic portion of the reaction. This has led in extreme cases to atmospheric venting of the kettle contents. Because of this, a high cooling capacity is necessary to produce the resin in a safe and economic manner. The problem is solved by recognition of important considerations of the system design so it can be balanced, along with a change in the operation of the process and a new solution for handling the problem of entrainment. For the production of resin, the pre-resinous solution must be pre-heated to a certain temperature where the exotherm reaction can start efficiently. The batchcook has to follow a time-temperature-profile. During the production of resin, the condenser system is needed

- to keep a certain temperature in the kettle and to remove the exotherm heat
- to cooldown the batch to a certain temperature or to the lowest temperature at the final cooldown, as fast as possible
- to catch an out-of-control reaction created by a strong exotherm reaction (exotherm heat increases exponentially with temperature)

The batchcook is cooled by means of a vacuum system which decreases the pressure in the kettle to the boiling-point temperature (temperature-pressure boiling-point curve for water) and creates the pressure-difference which pulls vapor and an unknown amount of liquid resin (Entrainment) through a vapor recovery line and into a condenser. The vapor is then transported through a condenser in which the vapor collapses to liquid. These tubes are surrounded by coolant, such as water, which circulates through the condenser. As a result, the latent heat (resulting from changing vapor to liquid) and heat from additional subcooling of the liquid is transferred to the circulating water (in the cooling water system) and removed from the condenser system and accordingly from the kettle. The condensated liquid is then returned by means of a reflux line to the kettle.

In existing condenser systems, liquid resin particles, hereinafter referred to as liquid, particles, droplets or resin, Entrainment, which is pulled from the surface of the batchcook by the vapor velocity accelerating at the batch surface, accumulates on the walls of the condenser tubes. This resinous coating reduces the heat transfer-coefficient from the collapsing vapor to the circulating water (cooling-water system) in the condenser. This reduction of the efficiency of heat transfer increases the amount of time and cost required to cool the batchcook. As a consequence of the resin build-up, which is known as fouling, frequent cleaning of the condenser system is required.

Also, in the prior art, the operation of the system is controlled by observing the liquid level in a sight glass in the reflux line to control system operation. The prior art did not control system operation as a function of the pressure-difference in the system. The present invention includes installation of two pressure-transmitters to determine system pressure difference between the kettle pressure and the vacuum source 12, as well as absolute pressure at the kettle. The system is then controlled by reference to the pressure-difference which is considered to be the driving force for the kinetic energy which results in the mass flow and cooling rate.

SUMMARY OF THE INVENTION

A principal object of the present invention is to retard entrainment accumulation within the condenser tubes.

Another object of the present invention is to return to the Batchcook entrainment which would have otherwise accumulated in the condenser tubes.

A further object of this invention is to increase efficiency of present systems.

A further objective of this invention is to prevent atmospheric venting of the liquid container contents, i.e., control of a high exothermic reaction.

Another important objective of this invention is to improve the way of operating the process.

An additional object of this invention is to reduce Batchcook time through faster cooldown and higher batch temperature.

Another important object of the present invention is to decrease overall costs, including costs of condenser system cleaning.

The foregoing objects and still further objects will be understood based upon the following Detailed Description of Preferred Embodiments and Drawings, in which the parts described in the Specification are all shown by like numbered parts in the drawings.

DESCRIPTION OF THE DRAWINGS

FIG. 3 is a schematic diagram of an existing means for agitation of the batch contained in the kettle;

FIG. 4 is a schematic diagram of an existing kettle demonstrating the effect of kettle head vapor velocity and kettle head space height on entrainment;

FIG. 5 is a further schematic diagram of an existing kettle demonstrating the effect of kettle head vapor velocity and kettle head space height on entrainment;

FIG. 15 is a schematic diagram of an improved kettle demonstrating the effect of returning the reflux liquid along the axis of the agitation means above the level of the liquid surface of the resin in the kettle;

FIG. 16 is a schematic diagram of a reflux line, U-Loop of an existing condenser system, demonstrating the significance of U-Loop height;

FIG. 17 is a schematic diagram of an improved means for cleaning the reflux line;

DETAILED DESCRIPTION OF PREFERRED EMBODIMENTS

The following description sets forth the preferred embodiment of the improved condenser system according to the present invention. It will be understood that there are other embodiments of the present invention, and the scope of the present invention is not limited by the following description of preferred embodiment.

A. The Entrainment Extractor System

The Entrainment Extractor is a device where the vapor with the particle will enter tangentially. It can be any kind of device like a cyclone or cylindrical container.

Figure 36:
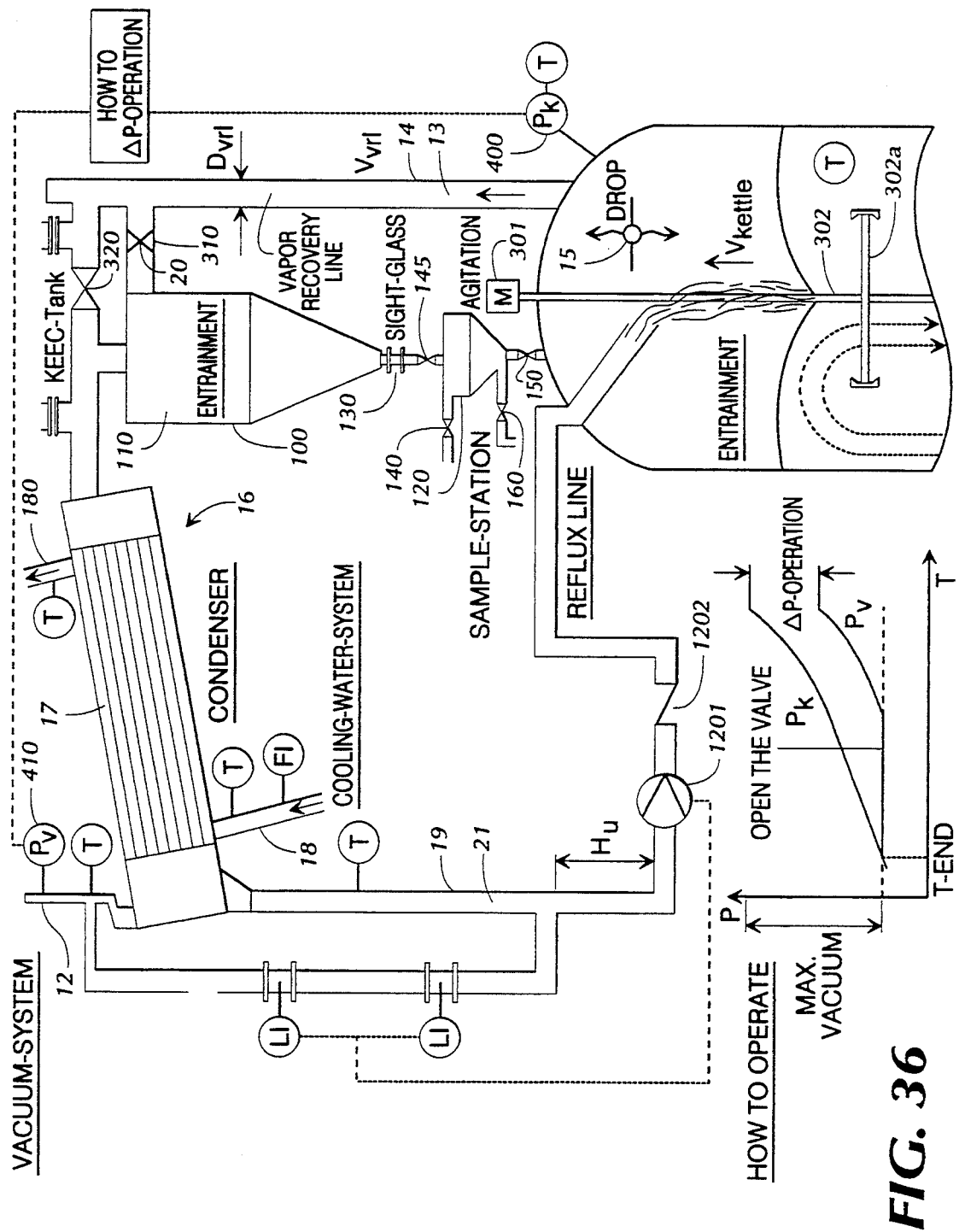
FIG. 36 is a schematic diagram of a preferred embodiment of the Improved Condenser System.

As shown in FIG. 36, a kettle 10 contains the Batchcook 11. As the pressure-difference created by the vacuum system 12 pulls vapor 13 through the vapor recovery line 14, small particles of sticky liquid resin (Entrainment 15 are being torn off from the surface of the boiling Batchcook 11 and are being carried with the vapor 13.

In the present invention, an Entrainment Extractor System 100 has been installed between the vapor recovery line 14 and the condenser 16 to separate the Entrainment particles 15 from the vapor particles 13. The Entrainment Extractor System 100 substantially reduces the amount of resin droplets 15 entering the tubes 17 within the condenser. As a consequence, heat transfer from the collapsing vapor 13 to the water 18 circulating around the condenser tubes 17 is not impeded by the accumulation of Entrainment 15, and the Batchcook 11 is cooled efficiently. Once the vapor 13 is condensed, it is returned to the Batchcook 11 by means of a reflux line 19.

FIG. 36 depicts a preferred embodiment of this invention in which the mixture 20 of vapor 13 and resin particles 15 travels from the vapor recovery line 14 into the Entrainment Extractor System 100. Upon tangentially entering the Entrainment Receptacle 110, the resin droplets would be forced to run along the wall because of the centrifugal force (momentum of the droplets). The lighter vapor particles 13 rise out of the Entrainment Receptacle 110 and flow into the condenser tubes 17, but the heavier resin droplets 15 collect at the bottom of the Entrainment Receptacle 110 and flow into an Entrainment Collector 120. Both the Entrainment Receptacle 110 and the Entrainment Collector 120 can be heat-traced to keep the viscosity of the resin 15 low.

A sight-glass 130 is located between the Entrainment Receptacle 110 and the Entrainment Collector 120 which allows the system's operator to detect an entrainment build-up or flow. When the Entrainment collector 120 fills up, the accumulated Entrainment 15 can be returned to the Batchcook 11 by briefly opening valve 140, and closing valve 145, which allows air into the system, and opening valve 150, which allow the accumulated resin to flow back into the Batchcook 11. Additionally, resin samples can be collected by opening valves 160 and 140 and closing valves 150 and 145. The return of the resin could also be handled by an installation of a reflux line pipe like is used for the condensate, rather than a collector.

The preferred embodiment of this invention also includes a mechanism by which the resin and vapor mixture 20 can by-pass the Entrainment Receptacle 110. It becomes necessary to by-pass the Entrainment Receptacle 110 when no entrainment occurs anymore or the pressure differential between the vacuum 12 and the kettle 10 decreases to a pre-determined level. The pre-determined level is a function of the size of resin droplets or amount which can be permitted in any given condenser without an unacceptable decrease in the efficiency of the heat transfer. The preferred embodiment includes pressure-transmitters at the kettle 400 and at the vacuum source 410 to measure the pressure-differential and to measure the absolute pressure at the kettle.

At high Batchcook 11 temperatures, the pressure is relatively high, and a high pressure difference between vacuum line 12 and kettle 10 is available to overcome the additional pressure drop through the Entrainment Extractor and to create a high vapor-velocity responsible for a fast cooldown.

As the Batchcook 11 cools, at low temperatures, the pressure in kettle 10 decreases and the pressure-differential available becomes too small to use an Entrainment Extractor. As a result of the lower-pressure differential, it becomes more difficult to create a high vapor velocity with use of an Entrainment Extractor. By opening the valve 320 in the vapor recovery line 14, the pressure differential responsible for the kinetic energy is increased due to the overall exclusion of the Entrainment Extractor which causes an additional pressure-differential. Additionally, a valve 310 may be desired to further isolate the entraining extraction means when valve 320 is opened.

Now this additional pressure-differential can be used to create a higher vapor velocity and quicken the cool-down at lower batch temperatures. Additionally, since lower Batchcook temperatures result in fewer resin droplets 15 being torn from the Batchcook surface 11, the need for the Entrainment Receptacle 110 is obviated.

B. The Improved Condenser System

1. The Improved Condenser System

The Improved Condenser System including the Entrainment Extractor System, is described in the following section.

2. Important Considerations in the Design of the Condenser-System

Figure 1:
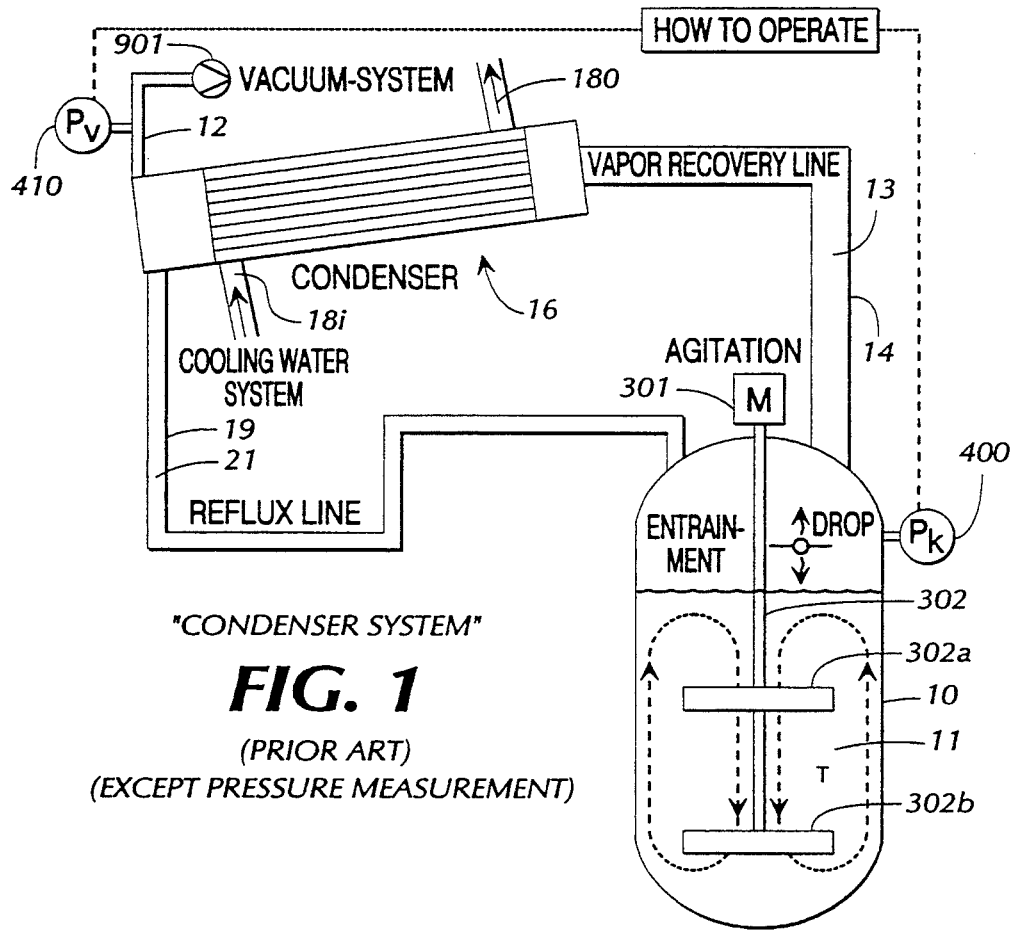
FIG. 1 is a schematic diagram of a condenser system showing an improved pressure measurement system.

Referring now to FIG. 1, to cool the batch 11 or relieve an exotherm, pressure in the kettle 10 is decreased, so that the liquid 11 starts boiling at a lower temperature. The steam 13 goes into the condenser and condenses to liquid 21, while the coolant 18 takes up the latent heat. The liquid (reflux) 21 will return to the kettle 10. The batch 11 cools down as you relieve the pressure even more to vaporize liquid at a lower temperature and the cycle starts again.

Figure 2:
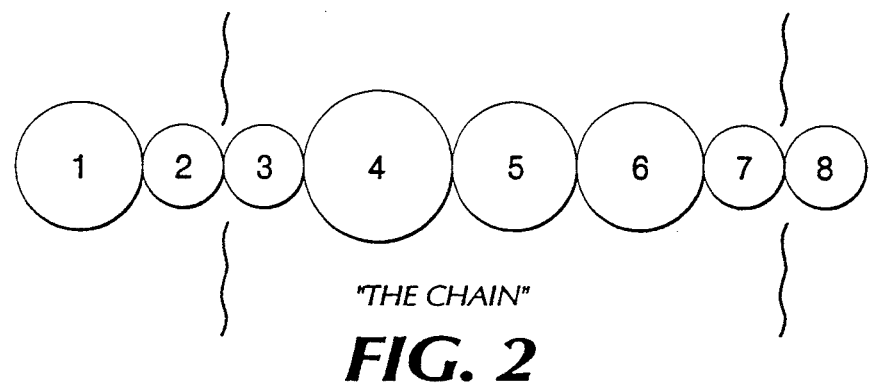
FIG. 2 is a second schematic diagram demonstrating the interrelationship of the elements of the system which must be considered and improved in accordance with the teaching of the present invention.

In the cycle you have to consider the following:
1. Agitation
2. Entrainment
3. Vapor-Recovery-Line
4. Condenser
5. Cooling-Water System
6. Vacuum System
7. Design of the Reflux Line
8. How to Operate 2.1 The "Chain" of Equipment Because of this operation-cycle, it is very important to design all parts of the condenser system so they are well balanced. To realize the importance of all parts you can look at the system like a chain as shown in FIG. 2.

The chain will break at the weakest part and the system is not able to cool the batch faster, even if you design the rest of the system very well.

THE WEAKEST PART WILL RULE THE SYSTEM!

Each link in this "chain" is discussed in the following paragraphs.

2.2 The Condenser System 2.2.1 Agitation

Referring now to FIG. 3, to get a homogeneous temperature in the kettle 10 and to mix the cold reflux 21 with the contents 11 of the kettle, it is necessary to agitate the batch 11 very well.

Considerations

1. Horsepower of the motor 301 (Turbulent flow-high Reynolds Number)
2. Design of the blades 302a and 302b 2.2.2 Entrainment Referring now to FIG. 4, entrainment is the inclusion of particles 15 in the vapor 13 entering the vapor-recovery-line 14. This occurs because of the velocity in the system.

Considerations

1. Height between boiling-surface and kettle-head

Since the surface is boiling, the acceleration of the steam from the surface to its final velocity tears off small droplets 15 into the vapor. There is a critical dropsize that depends on the final kettle headspace, vapor velocity, and the headspace height Hk. Droplets 15 bigger than the critical dropsize will settle back down to the batch surface. Smaller droplets 15 will follow the steam 13 into the vapor-recovery-line 14. The criteria: dropsize decreases and fewer droplets are entrained as the height of the kettle headspace Hk is increased. This is because the droplets 15 must stop accelerating and reach a terminal velocity before gravitational force can cause them to settle. The smaller the terminal headspace velocity, the smaller is the critical dropsize.

To calculate the kettle head space height Hk research needs to be done to determinate how much height is needed for the acceleration and how much height is necessary so the droplets 15 settle down.

2. Diameter of the kettle

Referring now to FIG. 5, to get the smallest velocity in the kettle and hence the smallest dropsize of liquid that would go into the vapor-recovery-line 14, it is important to design the diameter of the kettle Dk as large as possible.

$$\dot{m} = \delta \cdot A_K \cdot V_K \quad (1)$$

$$V_K = \dot{m}/(A_K \cdot \delta) \quad (2)$$

$\dot{m}$ = Massflow (lbs/sec)
$\delta$ = Density of saturated steam (lbs/ft$^3$)
$A_K$ = Area of the kettle (ft$^2$)
$V_K$ = Velocity in the kettle (ft/sec)

Another advantage is that you are able to get a higher rate of steam (Equation 3) from the boiling-surface of the batch. The droplets 15 have to go through the boiling-surface to vaporize.

$$\dot{m} = c \cdot A_b \quad (3)$$

$\dot{m}$ = Massflow (lbs/min)
c = Constant (lbs/min ft$^2$)
$A_b$ = Boiling-surface area (ft$^2$)

If the surface is larger, you are able to vaporize more liquid.

3. Dropsize

In the manufacture of resin, it is important to minimize entrainment to prevent fouling the condenser 16 (bad heat transfer coefficient) and coating the walls of the whole system (higher friction-factor—higher pressure drop in the system).

The maximum drop-size that is entrained in the vapor-recovery-line can be estimated by Stokes's law.

$$D_p = \frac{18 \cdot \eta \cdot V_k}{g \cdot (\delta_p - \delta)} \quad (4)$$

$$Re = D_p \cdot V_k \cdot \delta/\eta \quad (5)$$

$D_p$ = Diameter of droplet (ft)
n = Fluid viscosity (lbs/ft/sec)
$V_K$ = Velocity in the kettle (ft/sec)
g = Gravity (ft/sec$^2$)
$\delta_p$ = Density droplet (ft$^3$/lbs)
$\delta$ = Density fluid (ft$^3$/lbs)
Re = Reynold's Nr As mentioned before, the height Hk between the boiling-surface and the kettle-head (time to settle down) and also the kettle diameter itself (smaller or larger head space velocity) have a high influence in this case.

4. Foaming

It is necessary to prevent foaming on the boiling-surface. The foam could easily tear off the boiling surface and move into the vapor-recovery-line and foul the system.

2.2.3 Vapor-Recovery-Line

Considerations

1. Diameter of Vapor-Recovery-Line

Figure 6:
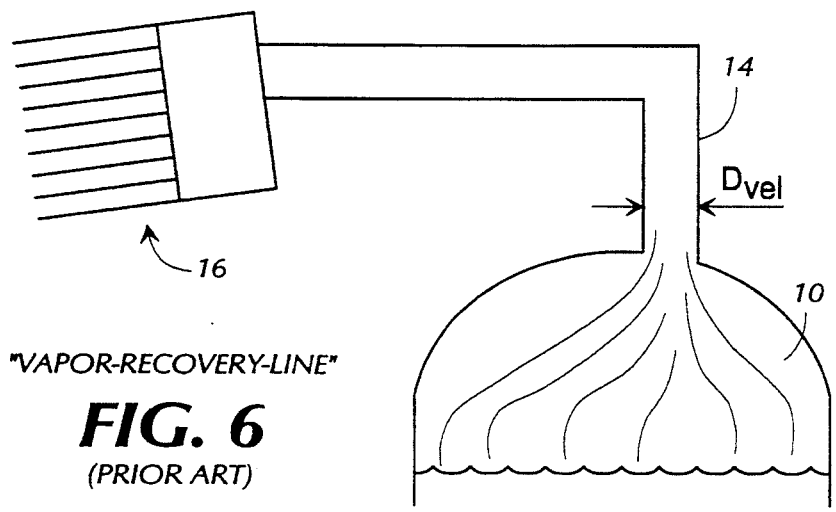
FIG. 6 is a schematic diagram of an existing vapor-recovery line demonstrating the effect of vapor-recovery line design on system operation.

Referring now to FIG. 6, because of the pressure drop in the vapor-recovery-line, it is very important to design the diameter of this line as large as possible.

$$\Delta P_{fv} = \frac{\delta}{2} \cdot V_{Vrl}^2 \cdot \left( \xi_{vrl} + \frac{\lambda_{vrl} \cdot L_{vrl}}{D_{vrl}} \right) \quad (6)$$

$\Delta P_{fv}$ = Pressure drop in Vapor-Recovery-line (lbs/ft/sec$^2$)
$\delta$ = Density of vapor (lbs/ft$^3$)
$\epsilon_{vrl}$ = Additional friction loss in Vapor-Recovery-Line
$\lambda_{vrl}$ = Friction factor in Vapor-Recovery-Line
$V_{vrl}$ = Velocity in Vapor-Recovery-line (ft/sec)
$L_{vrl}$ = Length of Vapor-Recovery Line (ft)
$D_{vrl}$ = Diameter of Vapor-Recovery-Line (ft)

This way you will have more pressure-difference available to produce kinetic energy and drive the massflow.

Although less pressure drop helps the design of the reflux-line 14, less pressure drop needs less effective height between the kettle head 10 and condenser 16.

2.2.4 Condenser

Figure 7:
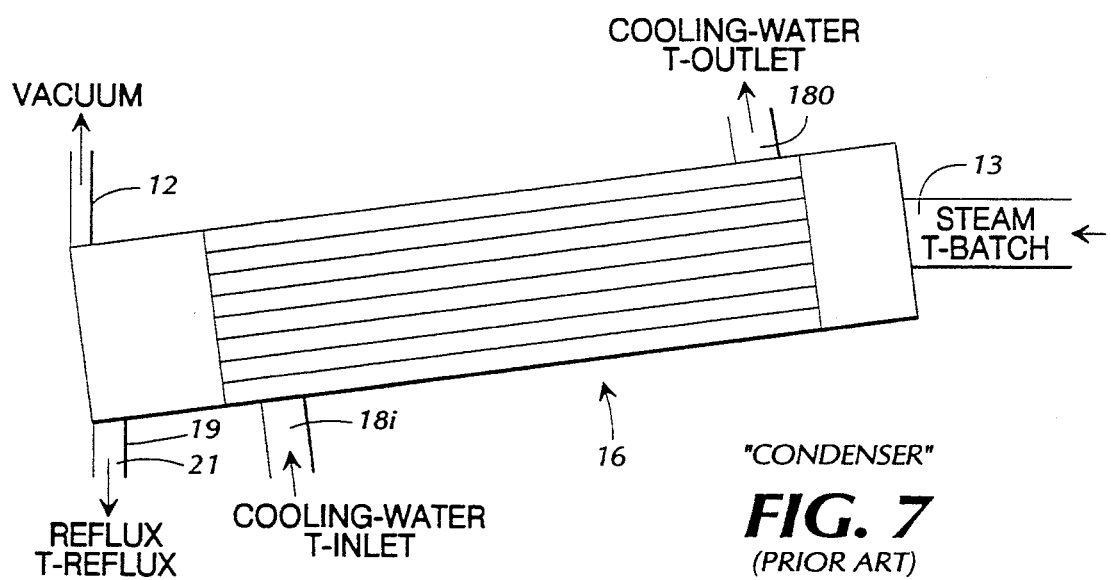
FIG. 7 is a schematic diagram of an existing condenser demonstrating the interrelationship of the various elements of condenser system design and configuration on system operation.

Referring now to FIG. 7, to handle the condensation of the steam 13, vapor released by the reaction, the latent heat has to go from the steam 13 to the cooling-water system 18.

Considerations

1. Large Heat-Transfer-Area
2. High Heat-Transfer-Coefficient (less Entrainment-less fouling)
3. Low cooling-water 18i inlet temperature and a high massflow of water 18 keeps the outlet temperature of the cooling-water 18o small and provides a higher Log-Mean-Temperature Difference.

$$\dot{Q}_c = U_c \cdot A_c \cdot DLMT_c$$

$$DLMT_c = \frac{(T_{out} - T_{in})}{\text{Log} \frac{(T_b - T_{in})}{(T_b - T_{out})}}$$

$\dot{Q}_c$ = Condenser cooling rate (Btu/hr)
$U_c$ = Heat transfer coefficient (Btu/ft$^2$/F/hr)
$DLMT_c$ = Log mean temperature (F)
$A_c$ = Condenser cooling area (Ft$^2$)
$T_b$ = Batch temperature (F)
$T_{in}$ = Condenser inlet-temperature (F)
$T_{out}$ = Condenser outlet-temperature (F)

2.2.5 Cooling-Water System

Figure 8:
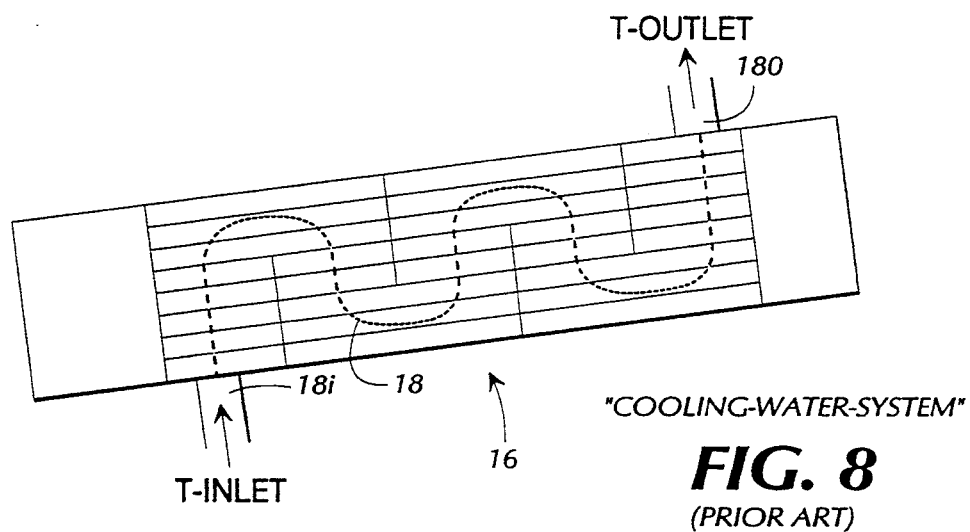
FIG. 8 is a further schematic diagram of an existing condenser cooling system demonstrating the effect of condenser design on condenser efficiency.

Referring now to FIG. 8, the cooling-water system has to handle the heat-transfer through the tubes in the condenser.

Considerations

1. Inlet temperature

Provides a high Log-Mean-Temperature Difference, the lower the temperature.

2. Massflow

Cooling-water outlet temperature is decreasing with a higher cooling-water massflow and provides a higher Log-Mean-Temperature Difference.

$$\dot{Q}_c = \dot{Q}_w = \dot{m}_{cw} sh_{cw}(T_{out} - T_{in}) \quad (9)$$

$\dot{Q}_c$ = Condenser cooling rate (Btu/min)
$\dot{Q}_w$ = Cooling-water cooling rate (Btu/min)

$\dot{m}_{cw}$ = Massflow cooling-water (lbs/min)
$sh_{cw}$ = Specific heat (Btu/lbs/F)
$T_{in}$ = Condenser inlet-temperature (F)
$T_{out}$ = Condenser outlet-temperature (F)

3. Velocity and design

To improve the heat-transfer coefficient, it is necessary to have a high velocity (high Rey-Nr.) around the tubes and crossflow through the tube bundle.

2.2.6 Vacuum System

Figure 9:
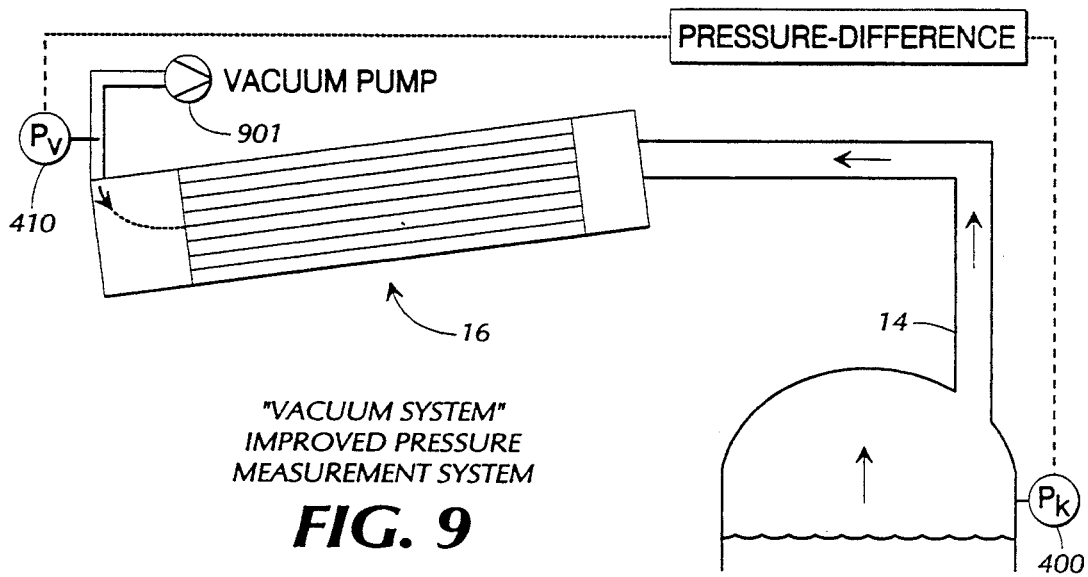
FIG. 9 is a schematic diagram of an improved condenser system according to the present invention showing the means for measurement of the pressure differential established by the pump means and the kettle.

Referring now to FIG. 9, the vacuum-pressure Pv controls the driving force of the condenser system 16 because it creates a pressure difference in the condenser 16 and vapor-recovery-line 14.

Considerations

1. Vacuum pumps

To cooldown to a very low temperature, the vacuum pumps 901 need to be designed so that you get the highest vacuum in the kettle. Also it is important to reach a certain pressure in the kettle as soon as possible, to provide the kettle with cooling.

2. Leaks

Leaks in the condenser system 16 decrease the rate and maximum vacuum in the system.

2.2.7 Design of the Reflux-Line

Figure 10:
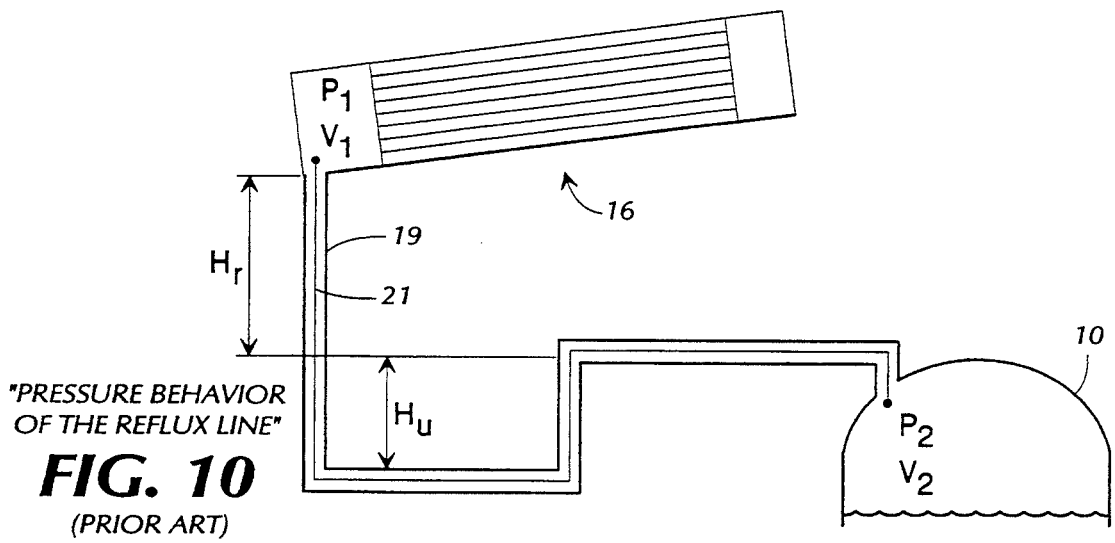
FIG. 10 is a schematic diagram of an existing condenser system demonstrating the effect of reflux line design on condenser system operation.

Referring now to FIG. 10, the reflux-line 19 needs to be designed so that it can manage any massflow 21 coming out of the condenser system. This is very important during a run-away-reaction, because you have to handle a high massflow and a high pressure difference in the condenser 16 system.

$$P_1 + \delta \cdot g \cdot H_r + \delta/2 \cdot V_1^2 = P_2 + \delta \cdot g \cdot H + \delta/2 \cdot V_2^2 + \Delta P_{fr} \quad (10)$$

$V_1 = 0$
$H = 0$ $$\Delta P_{fr} = \frac{\delta}{2} \cdot V_2^2 \cdot \left( \xi_r + \frac{\lambda_r \cdot L_r}{D_r} \right) \quad (11)$$

$$P_2 - P_1 = \Delta P - \text{Operation} = \Delta P_{sys} \quad (12)$$

$$H_r = \frac{\Delta P_{sys} + \frac{\delta}{2} \cdot V_2^2 \cdot \left( 1 + \xi_r + \frac{\lambda_r \cdot L_r}{D_r} \right)}{\delta \cdot g} \quad (13)$$

$P_1$ = Pressure at the entrance of the reflux line (lbs/ft/sec$^2$)
$P_2$ = Pressure in the kettle (lbs/ft/sec$^2$)
$\delta$ = Density of the reflux (lbs/ft$^3$)
$g$ = Gravity (ft/sec$^2$)
$H_r$ = Efficient height between kettle head and condenser (ft)
$V_1$ = Velocity at the entrance of the reflux line (ft/sec)
$V_2$ = Velocity through reflux line (ft/sec)
$\Delta P_{fr}$ = Pressure drop through reflux line (lbs/ft/sec$^2$)
$\epsilon_r$ = Additional friction loss in reflux line
$\lambda_r$ = Friction factor in reflux line
$L_r$ = Length of reflux line
$D_r$ = Diameter of reflux line Considerations 1. Max. height between boiling-surface and condenser.

The pressure difference in the system (vapor-recovery-line 14, condenser 16, $\Delta P$-boiling) will suck a liquid column to a certain height in the reflux-line 19. To overcome this, we need additional height to get the kinetic energy and overcome the friction in the reflux-line 19, in order to permit reflux 21 to flow back to the kettle 10.

The reflux-line-height Hr should be designed so that it can handle more pressure-difference at an improved condenser-cooling performance and, as mentioned before, handle the higher pressure-difference and a higher massflow at a run-away-reaction.

Figure 11:
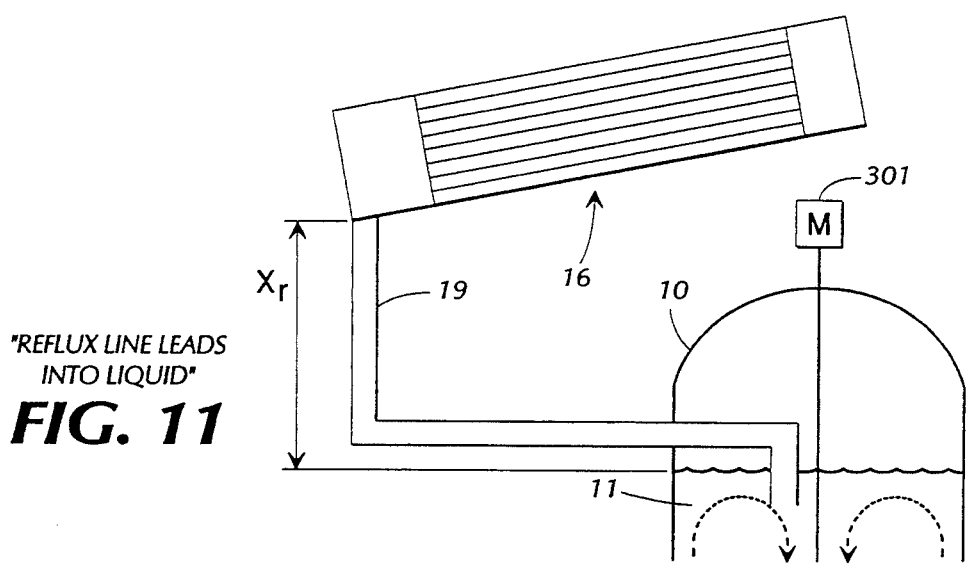
FIG. 11 is a further schematic diagram of an existing condenser system demonstrating the effect of reflux line configuration on condenser system operation.
Figure 12:
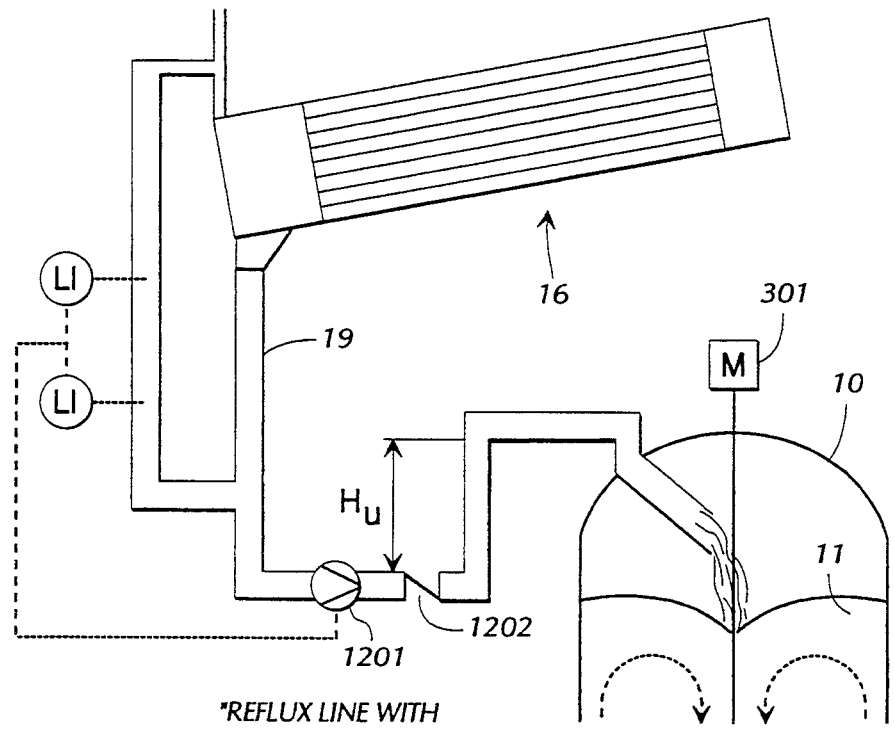
FIG. 12 is a schematic diagram of an alternative improved condenser system including a pump means for providing a positive pressure difference in the reflux line.

Proposal for design a. Referring now to FIG. 11, reflux line 19 leads into the batch 11 which gives the maximum height between boiling-surface and reflux entrance.

b. Referring now to FIG. 12, another solution would be to install a pump 1201. The pump 1201 can handle any massflow coming out of the condenser 16. The check valve 1202 will close the reflux line 19 when the pressure-difference in the system occurs.

2. No disturbance of the surface-boiling

The cold reflux-liquid should go right into the middle of the contents of the kettle 10 to cooldown the batch 11 and get a homogeneous temperature.

Figure 13:
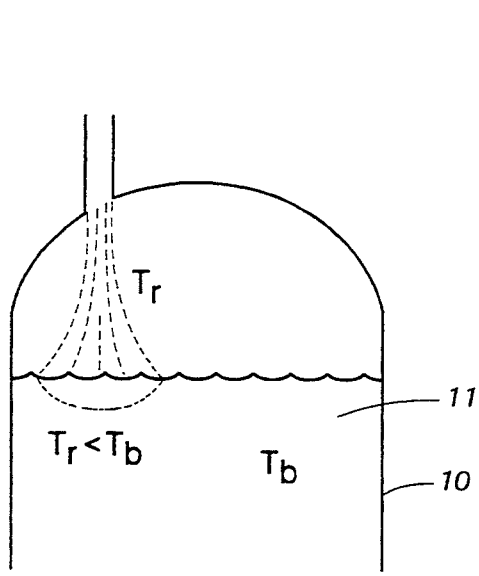
FIG. 13 is a schematic diagram of an existing kettle demonstrating the effect of returning reflux liquid above the level of the liquid surface of the resin in the kettle.

Referring now to FIG. 13, if the cold liquid drops on the boiling-surface, there is a cooldown of a certain area of the boiling-surface. This cooler area of the surface would need even higher vacuum to vaporize the liquid. Consequently, there is a decrease in the actual surface-boiling area.

Figure 14:
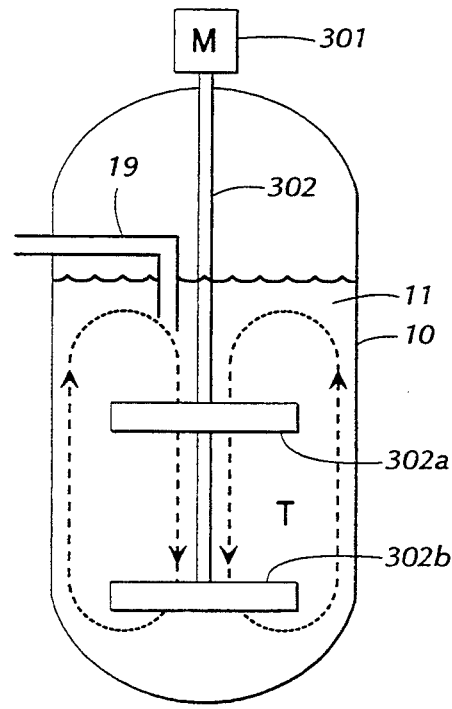
FIG. 14 is a schematic diagram of a kettle demonstrating the effect of returning reflux liquid below the level of the liquid surface of the resin in the kettle.

Proposal for design a. Referring now to FIG. 14, reflux-line 19 leads into the content of the batch 11 and will be mixed right away with the agitation.

b. As shown in FIG. 15, if a pump 1201 is installed in the reflux-line 19, the return line entering the kettle should lead to the shaft 302 of the agitator. The cold liquid runs down the shaft 302 and will be mixed with the batch 11 right away.

3. Prevention of pulling vacuum through the reflux-line

Referring now to FIG. 16, to prevent this happening, the reflux-line 19 is designed with a U-loop, called the "Hartford" loop.

If the liquid content in the U-loop is large enough to create a liquid-column to overcome the pressure-difference in the system, it is not possible to pull vacuum backwards through the reflux-line 19.

$$H_u = \Delta P_{sys}(\delta \cdot g) \quad (14)$$

$$Vo_r = H_u \cdot A_r \quad (15)$$

$H_u$ = Height of the liquid column (ft)
$\Delta P_{sys}$ = Pressure-difference in the System (lbs/ft/sec$^2$)
$\delta$ = Density of the reflux (lbs/ft$^3$)
$g$ = Gravity (ft/sec$^2$)
$Vo_r$ = Volume in the U-Loop (ft$^3$)
$A_r$ = Area of reflux line (ft$^2$)

Referring again to FIG. 14, another alternative is to place the end of the reflux-line 19 into the liquid of the batch 11. It is not possible to pull vacuum through the reflux-line 19 and you do not need the U-loop.

The liquid seals the end of the reflux line 19 from vacuum.

4. Keep the reflux-line clean

It is essential that the reflux-line 19 stays clean and has no possibility of blockage. Blockage could cause a dangerous situation, because the condenser 16 system would lose its cooling-capacity.

Referring now to FIG. 17, a proposal for design:

Close valve 1701, 1702 and open valve 1703. Now run a caustic-solution through the reflux line 19 to clean the pipe.

5. Prevention of condenser flooding

This is a very important point. When the condenser 16 is flooded, there will be a decrease in the efficiency of the condenser 16 immediately, thus decreasing the capacity of the condenser 16.

Figure 18:
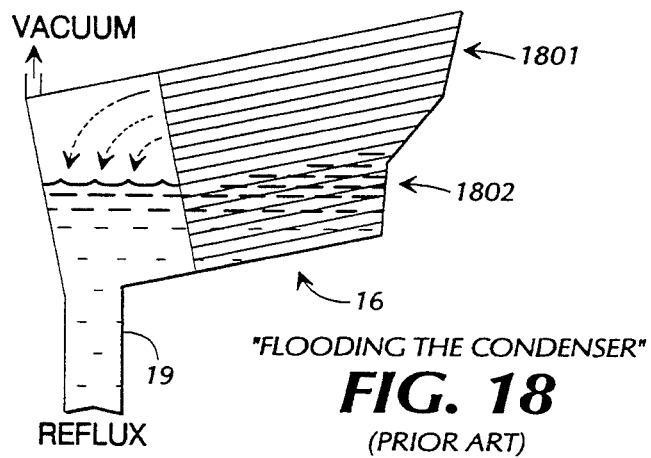
FIG. 18 is a schematic diagram of an existing condenser system demonstrating the effect of reflux line design and configuration on condenser output.

Referring now to FIG. 18, vapor will only enter and condense through the upper tubes 1801. The tubes 1802 below the liquid-level will not be used for cooling or condensing anymore. The efficient (effective) area of the condenser is getting smaller. Also vapor-breakthrough (when vapor goes through the tubes and does not condense) occurs easier at this point. The temperature in the reflux-line 19 will be very high, because you do not subcool the reflux anymore (less area for cooling).

The reason for this effect is an improper design of the reflux-line 19. The reflux-line 19 cannot handle the pressure-difference in the condenser 16 system and the high massflow.

Since both a high pressure-difference and a high massflow occur during a run-away-reaction, the reflux line height Hr should be designed to handle this. Condenser 16 flooding must be prevented both to run the batch 11 cooling more efficiently and safely.

Figure 19:
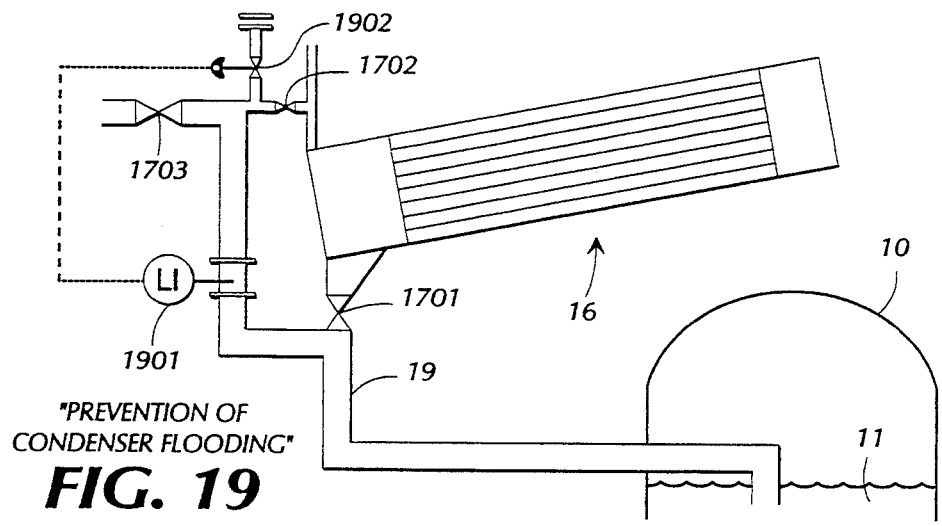
FIG. 19 is a schematic diagram of a first improved condenser-reflux line design and configuration designed to prevent condenser flooding.
Figure 20:
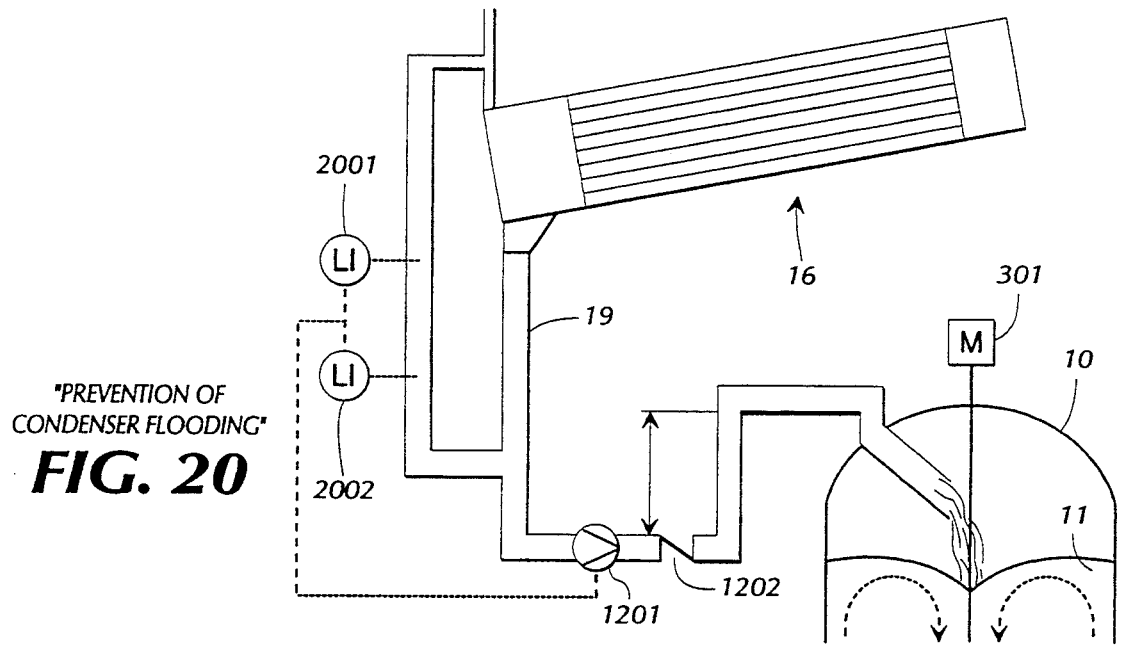
FIG. 20 is a schematic diagram of a second improved condenser-reflux line design and configuration designed to prevent condenser flooding.

Referring now to FIG. 19, a proposal for design is shown.

a. Prevention of condenser 16 flooding with a level indicator 1901 and control valve 1902.

b. Referring now to FIG. 20, prevention of condenser 16 flooding with level indicator 2001 and 2002 and pump 1201 installation is shown.

6. Traffic problem

The condensed liquid is typically coming out of more than 600 condenser tubes. At the end of the condenser 16 the liquid needs to be efficiently collected before it enters the reflux-line 19. This prevents a higher friction-factor and foaming in the entrance of the reflux-line.

Figure 21:
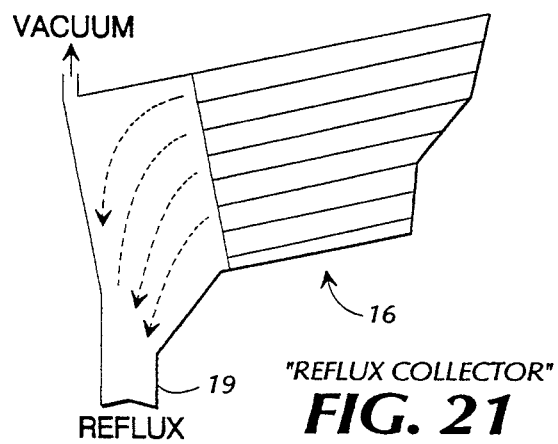
FIG. 21 is a schematic diagram of a reflux collector for use in conjunction with an improved condenser system according to the present invention.

Referring now to FIG. 21, a proposal for design is shown.

2.2.8 How to operate

Figure 22:
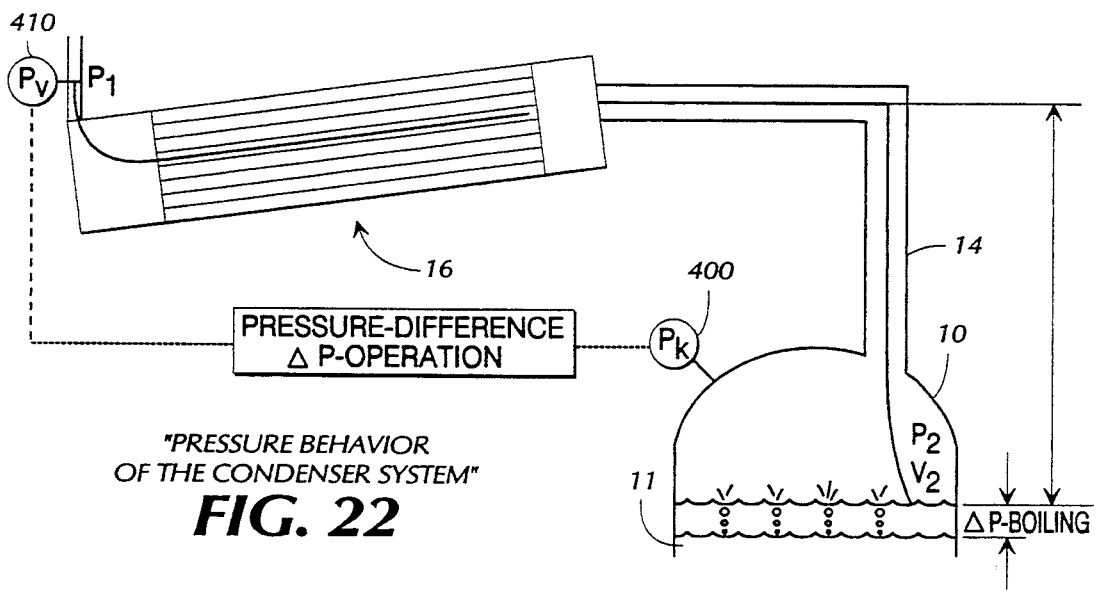
FIG. 22 is a schematic diagram of a segment of the improved condenser system according to the present invention demonstrating the measurement of pressure differential between the vacuum line and the surface of the liquid in the kettle.

Referring now to FIG. 22, the key to controlling and regulating the cooling-capacity of the condenser system is as follows.

The driving-force for the cooling-performance is the pressure-difference in the vapor-recovery-line 14. This pressure difference is responsible for the massflow through the condenser system 16 and the massflow is responsible for the cooling-capacity.

$$P' + \delta \cdot g \cdot H_{vrl} + \delta/2 \cdot V'^2 + \Delta P_b = \quad (16)$$
$$P_2 + \delta \cdot g \cdot H_2 + \delta/2 \cdot V_2^2$$

$V_2 = 0$
$H_2 = 0$
$\delta \cdot g \cdot H_{vrl} = 0$ $$\Delta P_{fv} = \frac{\delta}{2} \cdot V'^2 \cdot \left( \xi_{vrl} + \frac{\lambda_{vrl} \cdot L_{vrl}}{D_{vrl}} \right) \quad (17)$$

$$P_2 - P' = \delta/2 \cdot V'^2 + \Delta P_{fv} + \Delta P_b = \Delta P_{2-1} \quad (18)$$

$$\Delta P_{2-1} = P_2 - P_1 = \Delta P_{2-1} + \Delta P_{con} \quad (19)$$

$$\Delta P_{2-1} = \frac{\delta}{2} \cdot V'^2 \cdot \left( 1 + \xi_{vrl} + \frac{\lambda_{vrl} L_{vrl}}{D_{vrl}} \right) + \Delta P_b + \Delta P_{con} \quad (20)$$

P' = Pressure at the entrance of the condenser (lbs/ft/sec²)
$P_1$ = Pressure at the entrance of reflux line Vacuum line (lbs/ft/sec²)
$P_2$ = Pressure in the kettle (lbs/ft/sec²)
$\Delta P_{2-1}$ = Pressure-difference in the condenser-system ($\Delta$P-Operation) (lbs/ft/sec)
$\delta$ = Density of Vapor₂(lbs/ft³)
g = Gravity (ft/sec²)
$H_{vrl}$ = Height of Vapor-Recovery-Line (ft)
V' = Velocity in the Vapor-Recovery-Line (ft/sec)
$V_2$ = Velocity at the boiling-surface (ft/sec)
$\Delta P_{fv}$ = Pressure drop in the Vapor-Recovery-Line (lbs/ft/sec²)
$\Delta P_b$ = Driving force to boil₂ the liquid in the batch (lbs/ft/sec²)
$\epsilon_{vrl}$ = Additional friction loss in the Vapor-Recovery-Line Recovery-Line
$\lambda_{vrl}$ = Friction factor in the Vapor-Recovery-Line
$L_{vrl}$ = Length of Vapor-Recovery-Line (ft)
$D_{vrl}$ = Diameter of Vapor-Recovery-Line (ft)
$\Delta P_{con}$ = Pressure drop through the condenser (lbs/ft/sec²)

For a certain massflow (cooling-rate) you need the pressure-difference in the vapor-recovery-line required for the following:

a) kinetic energy $$\Delta P_{kin} = \frac{\delta}{2} \cdot V_{vrl}^2 \quad (21)$$

$\Delta P_{kin}$ = Pressure-difference for the kinetic energy (lbs/ft/sec)
$\delta$ = Density of vapor (lbs/ft³)
$V_{vrl}$ = Velocity in the Vapor-Recovery-Line (ft/sec)

b) pressure drop in the system $$\Delta P_{fv} = \frac{\delta}{2} V_{vrl}^2 \cdot \left( \xi_{vrl} + \frac{\lambda_{vrl} \cdot L_{vrl}}{D_{vrl}} \right) \quad (22)$$

$\Delta P_{fv}$ = Pressure drop in Vapor-Recovery-Line (lbs/ft/sec²)
$\delta$ = Density of vapor (lbs/ft³)
$V_{vrl}$ = Velocity in Vapor-Recovery-Line (ft/sec)
$\epsilon_{vrl}$ = Additional friction loss in Vapor-Recovery-line
$\lambda_{vrl}$ = Additional friction loss in Vapor-Recovery-Line
$L_{vrl}$ = Friction factor in Vapor-Recovery-Line (ft)
$D_{vrl}$ = Diameter of Vapor-Recovery-Line (ft)

c) to boil the liquid-surface $\Delta P_b$ = Driving force to vaporize the liquid to steam through the boiling-surface d) pressure drop through the condenser $\Delta P_{con}$ = Pressure drop through the condenser, based on lost of kinetic energy and liquid run through the tubes To keep the batch 11 at a target temperature, set the pressure in the kettle 10 equal to vapor pressure of the boiling-liquid at that temperature. By doing so the liquid will boil immediately if the batch-temperature rises above the set-point temperature (set-point pressure).

If there is a strong exotherm reaction and the heat creation is known, then it will also be known how much cooling-rate is necessary to keep the batch at a certain temperature. From the known cooling rate, we can calculate the pressure-difference in the condenser system required to cool the overshooting exothermic reaction.

For the final cooldowns at the end of the cook, each condenser system has an optimum vacuum pressure-batch temperature profile. This profile is a function of the condenser system dimensions.

2.3 Case of an Emergency (Run-Away-Reaction)

Figure 23:
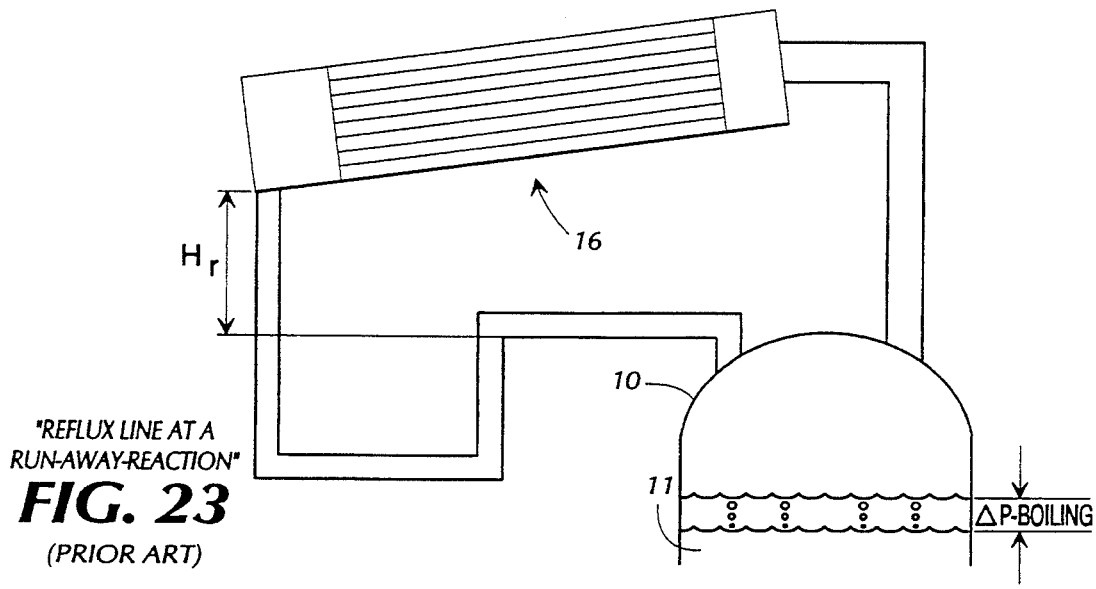
FIG. 23 is a schematic diagram of an existing condenser system demonstrating the system during a runaway exothermic reaction.

Referring now to FIG. 23, in case a batch 11 is getting out of control (run-away-reaction) the temperature and pressure can exceed 212 F and 1 atmosphere, respectively.

$$\delta \cdot g \cdot H_r = \Delta P_{sys} + \delta/2 \cdot V_r^2 + \Delta P_{fr}(V_r^2) \quad (23)$$

$$\Delta P_{sys} = \delta/2 \cdot V_{vrl}^2 + \Delta P_{fr}(V_{vrl}^2) + \Delta P_{con}(V_{vrl}^2) + \Delta P_b(V_{vrl}^2) \quad (24)$$

with $$V_r \delta_r A_r = V_{vrl} \delta_{vrl} A_{vrl} = m = \text{constant} \quad (25)$$

$$V_{vrl}(V_r) = C(T) \cdot V_r \quad (26)$$

as follows, $$\delta_r \cdot g \cdot H_r = \delta_r/2 \cdot C(T)^2 \cdot V_r^2 + C(T)^2 \Delta P_{fv}(V_r^2) + C(T)^2 \Delta P_{con}(V_r^2) + C(T)^2 \Delta P_b(V_r^2) + \delta_r/2 \cdot V_r^2 + \Delta P_{fr}(V_r^2) \quad (27)$$

$$\delta_r \cdot g \cdot H_r C =_1 (T \cdot V_r) \cdot V_r^2 \quad (28)$$

$$Q_c = m \cdot h = V_r \delta_r A_r \cdot h \quad (29)$$

$$V_r(Q_c) = C_2(T) \cdot Q_c \quad (30)$$

with equation (28) and (30) follows, $$\delta_r \cdot g \cdot H_r = C_1(T \cdot V_r) \cdot C_2(T)^2 \cdot Q_c^2 \quad (31)$$

now you get the equation for the height in regard of the cooling rate, $$H_r(Q_c) = C_3(T \cdot V_r) \cdot Q_c^2 \quad (32)$$

and the equation for the cooling-rate in regard of the height in the reflux line, $$Q_c(H_r) = C_4(T \cdot V_r) \cdot \sqrt{H_r}$$

$P_{sys}$ = Pressure difference in the condenser system (lbs/ft/sec$^2$)
$P_{fr}$ = Pressure drop in the reflux line (lbs/ft/sec$^2$)
$P_{con}$ = Pressure drop through the condenser (lbs/ft/sec$^2$)
$P_b$ = Pressure difference for boiling-riving-force (lbs/ft/sec$^2$)
$P_{fv}$ = Pressure drop in the Vapor-Recovery-Line (lbs/ft/sec$^2$)
$\delta_r$ = Density of the reflux (lbs/ft$^3$)
$\delta_{vrl}$ = Density of the vapor (lbs/ft$^3$)
g = Gravity (ft/sec$^2$)
$H_r$ = Efficient height of the reflux line (ft)
$V_r$ = Velocity through the reflux line (ft/sec)
$V_{vrl}$ = Velocity in the Vapor-Recovery-Line (ft/sec)
$A_r$ = Area of the reflux line (ft$^2$)
$A_{vrl}$ = Area of the Vapor-Recovery-Line (ft$^2$)

C(T) = Constant C depend on temperature
$C_1(T \cdot V_r)$ = Constant $C_1$ depend on temperature and reflux line velocity
$C_2(T)$ = Constant $C_2$ depend on temperature
$C_3(T \cdot V_r)$ = Constant $C_3$ depend on temperature and reflux line velocity
$C_4(T \cdot V_r)$ = Constant $C_4$ depend on temperature and reflux line velocity
$Q_c$ = Cooling rate (Btu/sec)
h = Latent heat (Btu/lbs)
m = Massflow through the condenser (lbs/sec)

At this point there is a critical need to get a high pressure-difference in the system, especially if the operators pull vacuum. It is necessary that the system still would work in this extreme situation. Also it is very important that flooding of the condenser 16 be prevented and that there is the maximum height Hr between boiling-surface and condenser available to handle the high pressure-difference and the high massflow through the system.

3. Improved Entrainment Proposal

Figure 24:
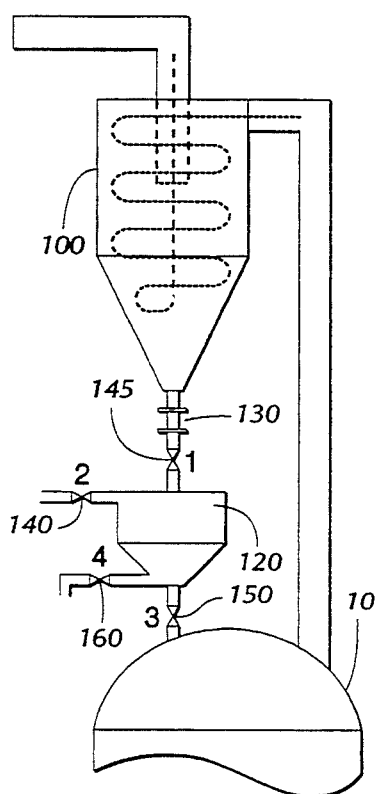
FIG. 24 is a schematic diagram of an improved condenser system including a cyclone means for removal of entrainment from the vapor recovery line prior to introduction of the vapor into the condenser.

Referring now to FIG. 24, low entrainment is the key to cooling down the batch faster and shortening the cooktime.

If you separate the entrainment from the vapor you are allowed to pull more vacuum (pressure-difference) for the kinetic energy. You get a higher velocity and thereby a higher massflow (cooling-rate) through the condenser system. Also we would like to know the entrainment with regard to the velocity in the kettle for a given design of the condenser system.

3.1 The Cyclone

Referring now to FIG. 24, a cyclone 100 is able to separate liquid from steam at a high efficiency.

At the entrance to the cyclone 100, the liquid-drop would be forced to run along the wall, because of the centrifugal force (momentum of the drop). The resin would fall down and be collected in a collector 120.

Between the cyclone 100 and the collector 120 is installed a sight glass 145, that will show you when entrainment occurs.

If the collector 120 is going to fill up, you close valve 145 and open valve 150. Now you just open the valve 140 for a moment and the resin in the collector 120 will be sucked back into the kettle 10 because of the vacuum in the kettle 10. If you want a sample of the liquid, you close valve 145 and open valve 140 and 160.

The only questions about a cyclone 100 is the pressure drop and keeping it clean. This cyclone 100 has to handle a high volume flow. Consequently the velocity through the cyclone would be very high.

The pressure-drop of the cyclone is a function of the velocity:

$$\Delta P_{cyc} = \overline{C} \cdot V_{cyc}^2 \quad (34)$$

$\Delta P_{cyc}$ = Pressure drop through the cyclone (lbs/ft/sec$^2$)
$\overline{C}$ = Constant C
$V_{cyc}$ = Inlet velocity of the cyclone (ft/sec)

With a higher velocity you will get a higher pressure drop in the cyclone 100.

A higher pressure-drop in the condenser 16 would mean that you are unable to cooldown the batch 11 fast enough at low temperature. This is because once maximum vacuum in the vacuum-line 12 is reached, the pressure-drop through the cyclone 100 would take too much of the pressure-difference driving force. The remaining pressure-difference for the kinetic energy (massflow, cooling rate) is too small to cooldown the batch fast.

At low temperature and low pressure the condenser 16 system will lose its efficiency. This problem is solved by the operation of the High- and Low-Temperature-Sequence.

3.2 High- and Low-Temperature Sequence

Figure 25:
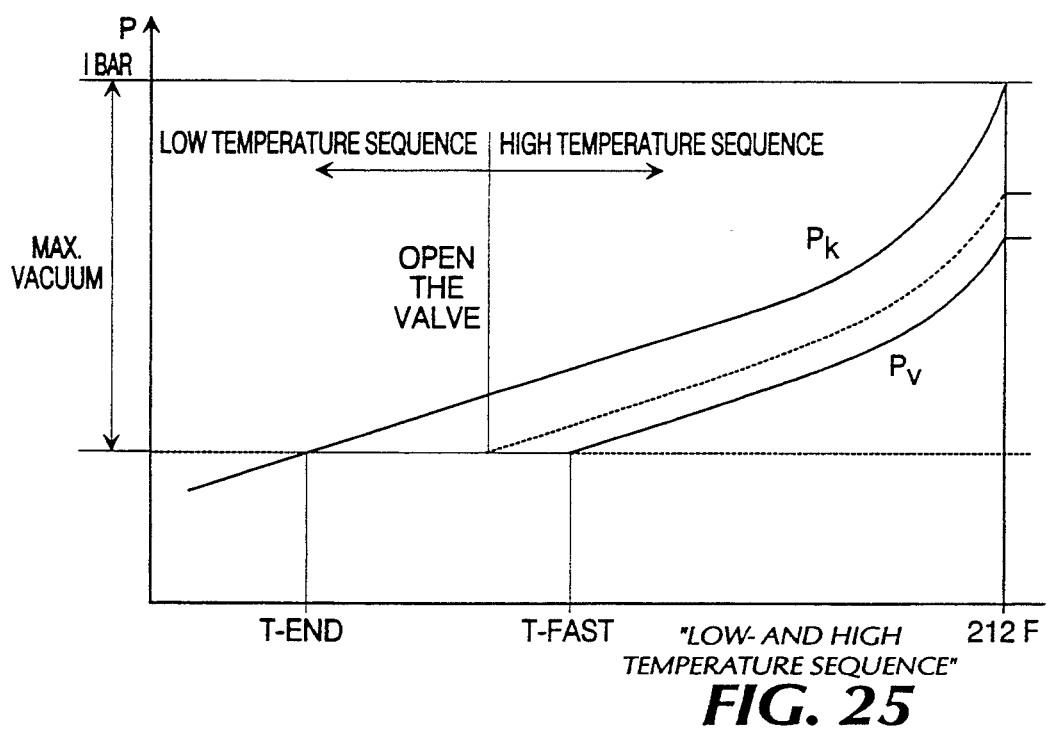
FIG. 25 is a graphic representation of the pressure-temperature relationship of the kettle and vacuum line during the cooldown of the batch, demonstrating the process of cooling the batch in accordance with the present invention.

Referring now to FIG. 25, at a high temperature you have a high pressure-difference in the condenser system (from kettle 10 to the vacuum-line 12) available. The maximum vacuum, depending on the vacuum pumps and leaks in the system, is about 27–29 inches of mercury.

Figure 26:
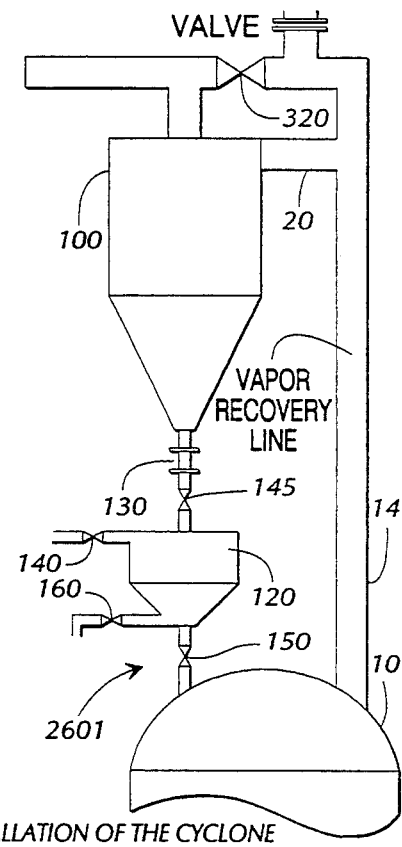
FIG. 26 is a schematic diagram of an improved condenser system including a cyclone means for removal of entrainment from the vapor recovery line and means for bypassing the cyclone means during operation in accordance with the present invention.

At high temperature you have the driving force
- to get the kinetic energy (massflow, cooling-rate of the system
- to handle the pressure-drop through the condenser system
- to handle the pressure-drop through the cyclone
- to handle the pressure-drop through the vapor-recovery-line At low temperature you want less pressure-drop and more pressure difference (driving-force) for the kinetic energy (massflow, cooling-rate) so that you can cooldown the batch 11 as fast as possible. To achieve both possibilities, the design shown in FIG. 26 is proposed.

At high temperature, you close the valve 320 in the vapor-recovery-line 14 and the steam with the liquid-droplets will go through the cyclone 100 and the liquid will be separated. The connection to the KEEC-tank is in front of the valve 320 so the system is always protected.

At low temperature, depending on the available pressure-difference, to get a certain velocity in the kettle, you open the valve 320 and close valve 310. The velocity at which the valve 320 is open depends on the drop-size you can afford in the condenser 16 system.

You assume a certain drop-size of liquid in the system. Now you calculate the velocity in the kettle 10, vapor-recovery-line 14 and the pressure-difference in the condenser 16 system. If you reach this pressure-difference between kettle 10 and vacuum-line 12, you open the valve. You are now able to cooldown to the lowest temperature as fast as possible without getting a larger drop-size in the condenser 16 system. The vapor would go through the vapor-recovery-line 14, because of the higher pressure-drop through the cyclone 100.

4.3 Practical Considerations

Because the liquid can be very sticky and the viscosity is very high, severe fouling of the cyclone 100 could occur.

Proposal for design a) The inlet and outlet diameter of the pipe 20 leading to the cyclone 100, as well as the diameter of the cyclone 100 itself, should be slightly oversized to prevent a higher friction-factor caused by a decrease in the diameters due to liquid coating the walls.

b) The cyclone 100, collector 120 and the return line to the kettle 2601 should be heat-traced to keep the viscosity low. The liquid flows easier to the collector 120.

Existing Condenser System in Comparison to the proposed Condenser System

This chapter will compare and explain the improvements needed to be done to the prior art. It describes the design and operation of the existing condenser system and explains why and what needs to change in particular.

Section 5.1 (existing condenser system, FIG. B) and Section 4. (improved condenser system, FIG. A) show the differences in two pictures. This will help to have an overview and shows the improvement in direct comparison.

5.2 What to improve

Each plant and each kettle has to be analyzed and checked for all these considerations and changes have to be done to balance the condenser system.

However, this section will describe important improvements needed in almost every kettle to run the batch more safely and more efficiently.

5.2.1 Entrainment

The prior art has no control over entrainment and there is no installation of any equipment to keep down the entrainment.

Figure 27:
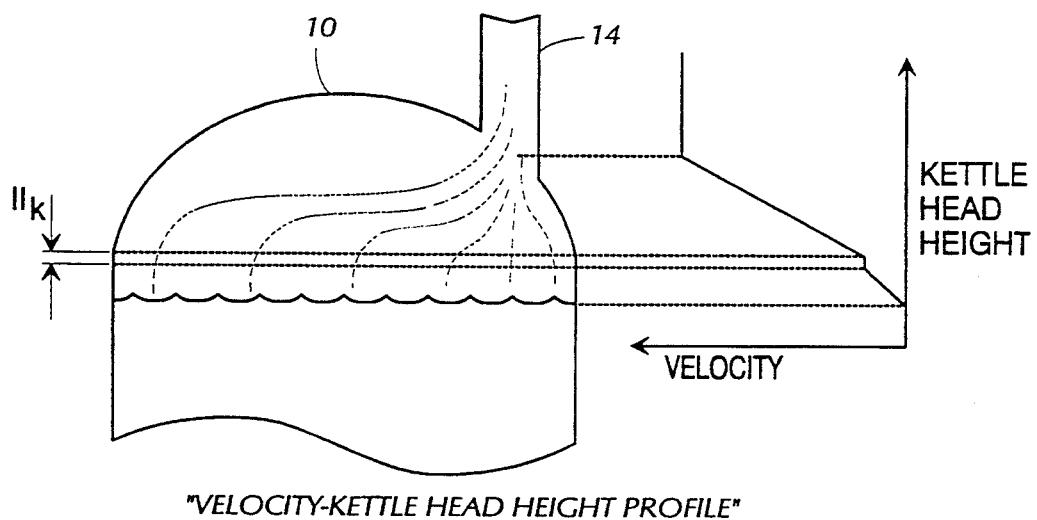
FIG. 27 is a schematic diagram of an existing condenser system demonstrating the kettle head height and combined with a graphic representation of the effect of kettle head height and kettle head vapor velocity on entrained particles removed from the surface of the liquid.

Referring now to FIG. 27, the prior art is filling up the kettles 10 from 80% capacity to the very top (full capacity). There is not much head left from the boiling-surface to the kettle-head to keep down the drop-size.

The effect is that the drop will accelerate to the velocity in the vapor-recovery-line. Big droplets will be torn off the batch-surface and have no possibility to settle down.

Once the liquid reaches the vapor-recovery-line 14, it will run to the condenser 16 because of the high velocity and create fouling. The system for preventing entrainment is designed poorly and needs to be improved.

The prior art requires operating carefully to keep down the entrainment. The operators at the plant may pull 1–2 in. of Hg to cooldown the batch and keep down the drop-size.

But to operate with a little pressure-difference will keep the cooling-rate low because of the small kinetic energy (small massflow) in the condenser system. This is not an efficient way to prevent entrainment, because it uses only a small portion of the condenser capacity.

To find another solution for entrainment and at the same time have the possibility to increase the driving-force (pressure-difference in the system) is one of the keys to increasing the cooling-capacity of the condenser system and running the batch more safely and more efficiently.

For example, if the prior art cooling rate is about 2–3 Btu/min/lbs at 180° F., that indicates a velocity in the kettle 10 of 2–3 ft/sec. But the kettles 10 have no head space to get the small velocity and laminar flow in the kettle vapor space. Right now the velocity increases immediately from 0 ft/sec to about 150–200 ft/sec in the vapor-recovery-line 14. The entrainment (drop-size) in that case is much higher than the drop-size would be at laminar flow from 2–3 ft/sec in the kettle 10.

Just to have the kettle-head space and to increase the velocity in the kettle 10 by a factor of two to about 6 ft/sec would already drop down the entrainment much and increase the cooling-capacity 100%.

To put a cyclone 100 in with the High- and Low-Temperature Sequence would be even more powerful, because you could see your entrainment in regard to the velocity in the kettle. Also it gives you a sample-station during the cook-time.

Figure 28:
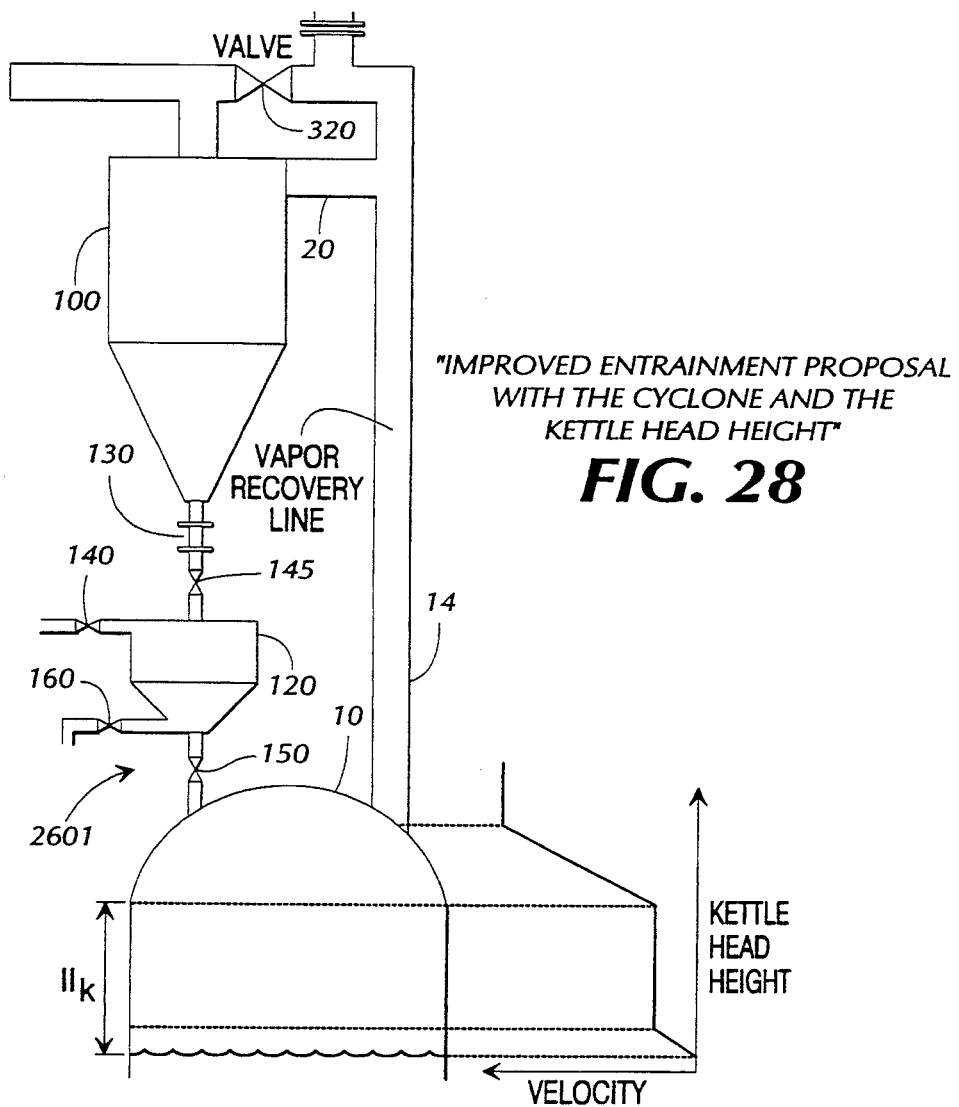
FIG. 28 is a schematic diagram of an improved condenser system of the present invention combined with a graphic representation of the effect of kettle head height and kettle head vapor velocity on entrained particles removed from the surface of the liquid.

The necessary changes are:
a. The prior art has to increase the height between boiling-surface and kettle-head b. Integration of a cyclone 100 with the High- and Low Temperature Sequence to the condenser system The improved version is shown in FIG. 28.

5.2.2 Vapor-Recovery-Line

The vapor-recovery-line 14 of many of the existing kettles are very small and that causes a high pressure-drop through the condenser system. Additionally you need more effective height in the reflux-line 21 to overcome this higher pressure-difference in the system. Thus less pressure-drop helps the design of the reflux-line 21.

5.2.3 The Reflux-Line

Figure 29:
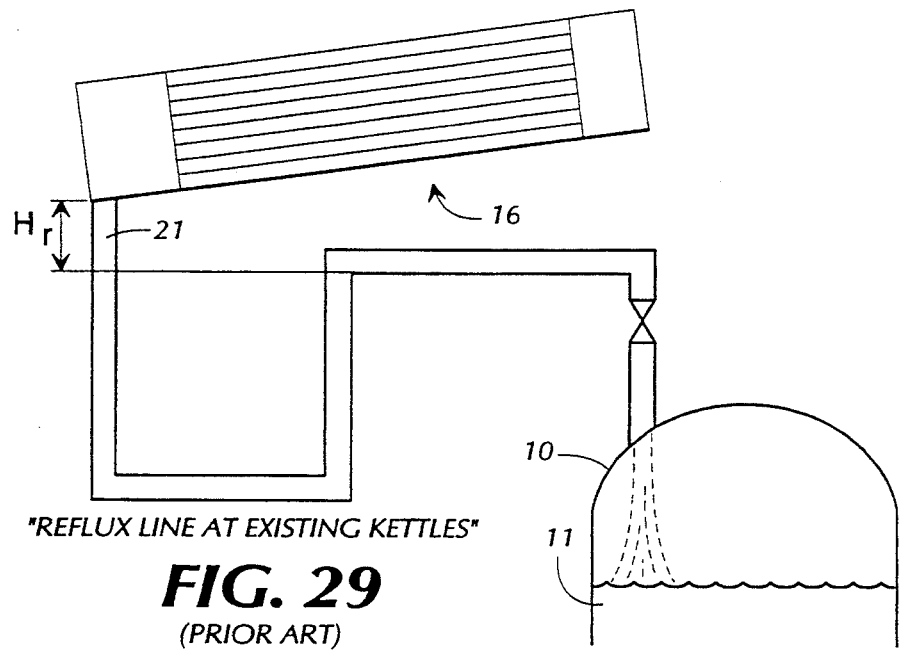
FIG. 29 is a schematic diagram of the reflux line design and configuration of existing condenser systems.

Referring now to FIG. 29, the design of the reflux-line is another important consideration in the condenser system.

The reflux-line 21 has to have the capacity to handle each possible pressure-difference in the system and each massflow coming out of the condenser 16, even at a run-away-reaction. To overdesign the reflux-line 21 is recommended, because of the extreme situation of an out-of-control reaction.

The Prior art has not focused previously on the design of the reflux-line. In fact in almost every plant, the reflux-line on each kettle is not designed in a proper and necessary way.

a. The effective height Hr to take care of the pressure-difference in the system and to get the condensed liquid back into the kettle is far too small.

In some cases the height is 1–2 ft. You may get a syphon-effect (which raises the effective height of the condenser), if the massflow is high enough. In normal operation you will flood the condenser before you get the syphon-effect. In case of a run-away-reaction, you may sometimes get the syphon-effect provided the massflow is in motion and the condenser 16 is not flooded. But the danger of flooding the condenser 16 first (cuts the cooling-capacity immediately) negates reliance on the syphon-effect.

The design of the reflux-line 21 has to be made without including the syphon-effect.

To emphasize the importance of the height Hr you should look at the FIG. 23, again. The pressure-difference of the system (equation 24) is the main part of the equation 23. If the diameter of the vapor-recovery-line 14 is smaller, you have a higher pressure-drop in the system to get the same cooling-rate as a kettle with a bigger Vapor-Recovery-Line 14. That indicates a need of more height Hr in the reflux-line 21 to handle this higher pressure-difference.

Figure 30:
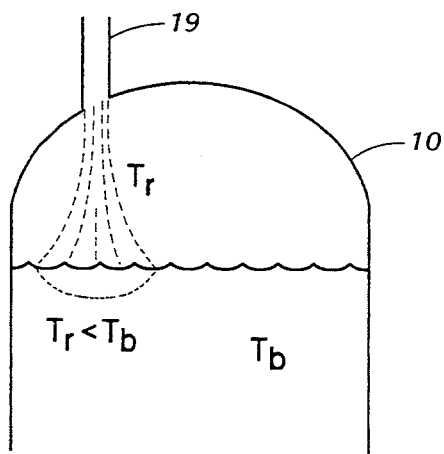
FIG. 30 is a schematic diagram of an existing kettle demonstrating the effect of returning reflux liquid above the level of the liquid surface in the kettle.

Also at a run-away-reaction the pressure-difference is very high and you have to handle a high massflow because of the higher density at higher temperature.

b. Referring now to FIG. 30, the design of the reflux-line 19 on the existing equipment cause the returning liquid to disturb the boiling-surface.

The colder liquid drops on the boiling-surface and locally cools down some of the boiling-surface. In this area the liquid-boiling would stop. The liquid has to vaporize and has to go through the boiling-surface. To get a higher cooling-rate it is necessary to avoid this effect.

c. Prevention of condenser flooding

Figure 31:
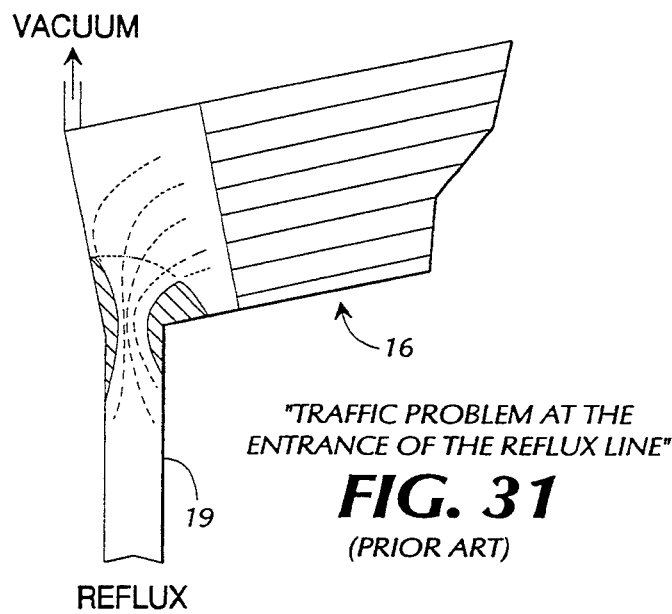
FIG. 31 is a schematic diagram of an existing condenser system demonstrating the effect of reflux line design and configurations on condenser output.
Figure 37:
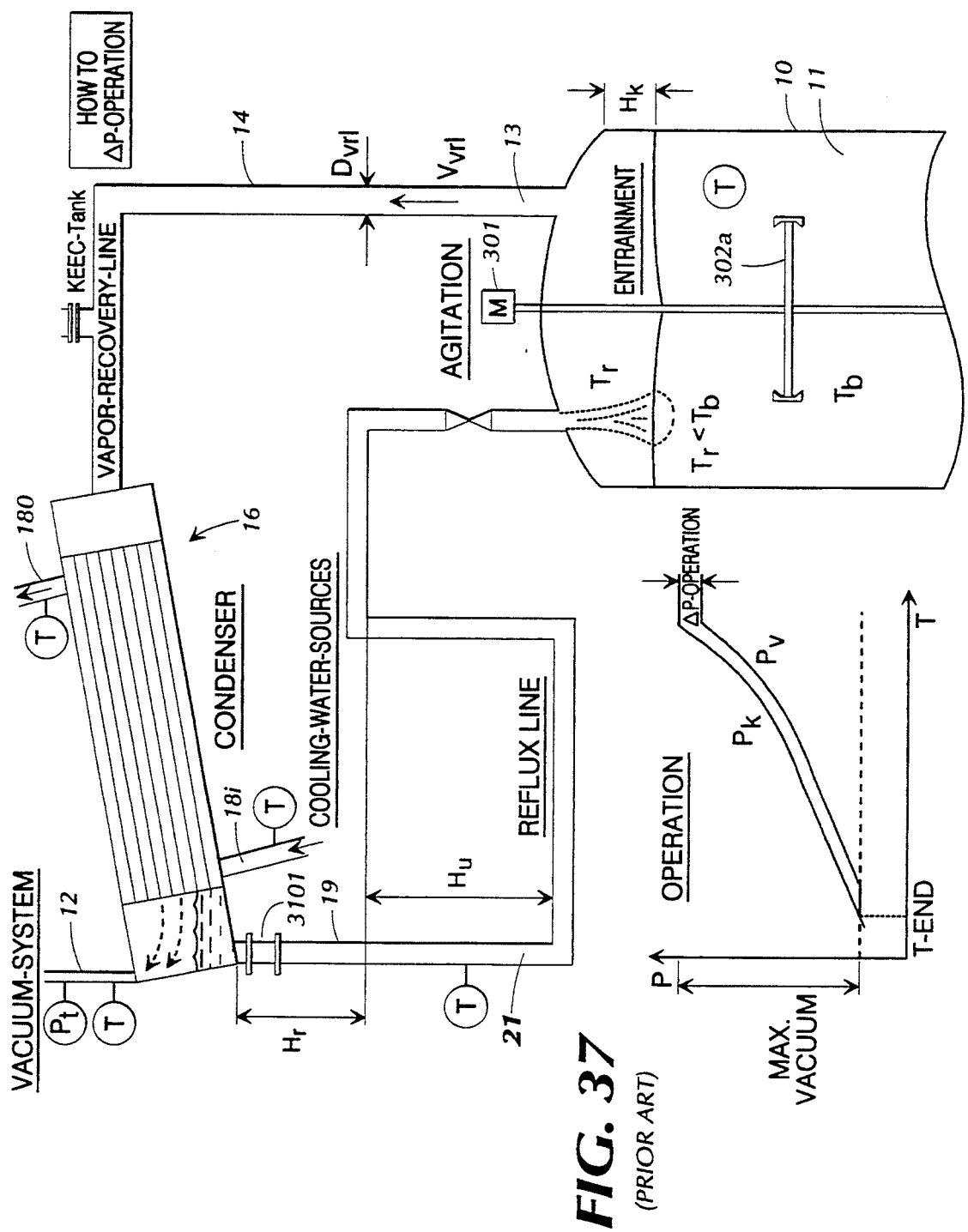
FIG. 37 is a schematic diagram of a prior art system.

Referring now to FIGS. 37 and 31, the only current prevention for condenser-flooding is to see a liquid-level rising up in a sight glass 3101 (FIG. 36). At that point the operator cuts down the vacuum 21.

This is not the proper way to do it. First you cut down the cooling-rate and secondly it is hard to see a liquid-level sometimes because you have a massflow going through the reflux-line. If you flood the condenser 16 under normal-operating conditions, that already indicates an improper design of the reflux-line 19.

d. Traffic problem

Referring now to FIG. 31, at the entrance of the reflux-line 19, there is no collecting channel for the liquid coming out of more than 500 tubes.

This creates a higher friction-factor and also foaming. Both need to be prevented.

5.2.4 How to operate

Figure 32:
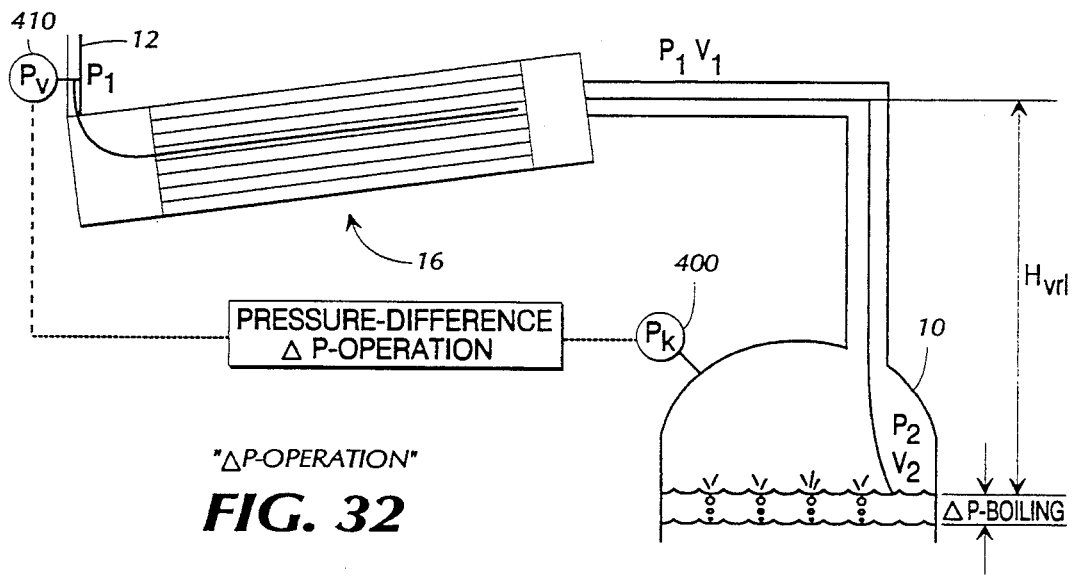
FIG. 32 is a schematic diagram of a segment of the improved condenser system according to the present invention demonstrating the measurement of pressure differential between the vacuum line and the surface of the liquid in the kettle.

Referring now to FIG. 32, the condenser system 16 is mainly used to keep the time-temperature profile of the resin-cooktime in shape. You need the condenser 16 system under normal operation in two cases:

1. to keep a certain temperature in the kettle constant and to remove the exotherm heat
2. to cooldown the batch to a certain temperature or to the lowest temperature at the final cooldown as fast as possible In the first case, the operators set the pressure in the vacuum-line 12 (the vacuum sensor 410 is on the vacuum line on almost every kettle) equal to a desired pressure thereby attempting to maintain a constant temperature in the kettle.

But this is not the right place to measure the pressure, because you will have a pressure-difference between the vacuum line 12 pressure and the kettle 10 pressure. That means the temperature and the pressure in the kettle 10 rise until you have created a pressure-difference in the system high enough to get the proper massflow (cooling-rate) to catch the temperature-rise in the batch.

The operators, at this point, are already worried about the system, because the batch-temperature rises too far (the temperature/pressure is not equal due to the system $\Delta P$)

The condenser 16 system can not work, before it has as its driving force, the pressure-difference. You have to measure the pressure in the kettle 10 at pressure sensor 3202 and to use it as the set-point. The liquid would start boiling right at this pressure and corresponding temperature and in this case the vacuum-pump 901 will work and create the pressure-difference in the system to keep the set-point pressure (temperature) constant.

If you know the heat creation of the exotherm reaction you can calculate, as described in Chapter 2.2.8, the necessary pressure-difference to keep the batch-temperature constant.

Another advantage is that the operators are more confident and trust the system.

In the second case, the operators watch the sight-glass 3101 in the reflux-line 19 and may pull 1–2 in. of mercury to cooldown the batch 11.

If the liquid-level rises up in the sight-glass 3101 they cut down the vacuum and thus they cut the cooling-rate.

In both cases the operation is not efficient and needs to be changed along with the design of the reflux-line and the entrainment.

Referring now to FIG. 32, an improved proposal: How to operate is shown.

The prior art has to add two pressure-sensors and transmitters or one absolute pressure sensor 3203 and one differential pressure sensor (more accurate) 3202 to measure the pressure in the kettle and the vacuum-line.

To keep a certain temperature constant, the operators take the pressure in the kettle 10 as set-point. They will see the pressure in the vacuum-line 12 dropping down with a higher creation of exotherm heat-rate, because the pump 901 has to pull more pressure-difference to maintain the pressure in the kettle 10.

Figure 33:
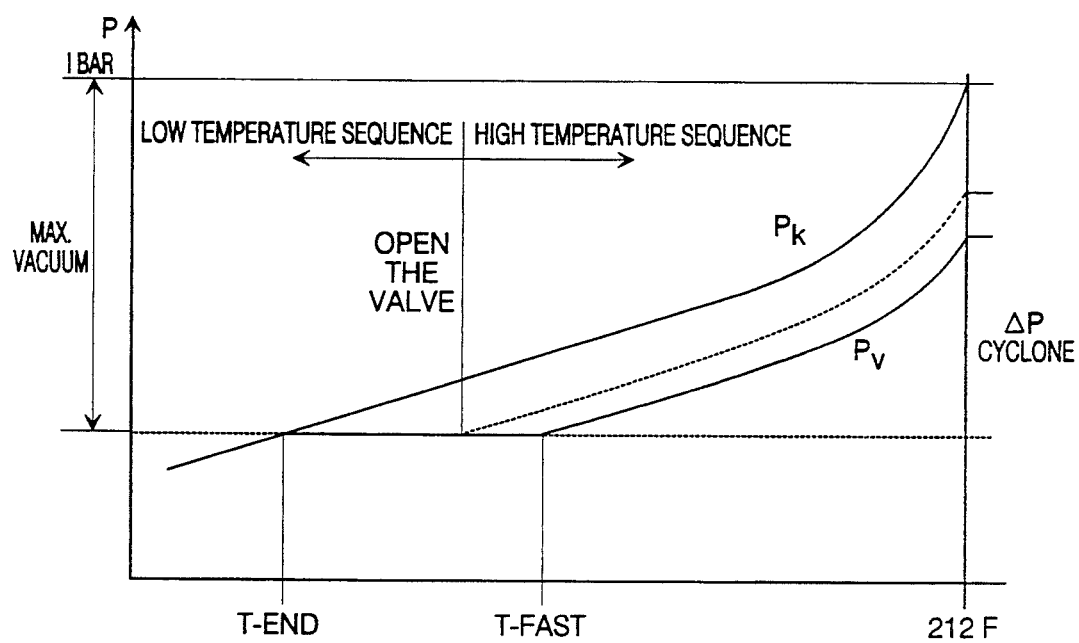
FIG. 33 is a graphic representation of the pressure-temperature relationship of the kettle and vacuum line during the cooldown of the batch, demonstrating the process of cooling the batch in accordance with the present invention.

Referring now to FIG. 33, for a cooldown or the final cooldown each kettle 10 and each condenser 16 system will have an optimum pressure-difference operation to cool down the batch. The optimum pressure-difference is based on all parts of the condenser 16 system and will prevent a high entrainment or flooding the condenser 16 while cooling efficiently.

An Analysis- and Simulation program can be developed to calculate the optimum pressure difference performance for each kettle and condenser system to achieve the maximum cooling-performance possible.

Therefore, for a cooldown, the operators just have to follow the calculated pressure-difference curve as closely as possible.

To do that, the operators take the pressure in the vacuum line 12 as pressure-set point and follow the calculated pressure-temperature-profile to cooldown the batch as fast as possible.

5.2.5 Behavior at a run-away-reaction

If the batch 11 is getting out of control, the temperature and pressure will exceed 212° F. and 1 atmosphere.

The operators have to catch this temperature and pressure rise. In this case the pressure-difference and massflow (high density at high temperature) in the system is increasing to 3–4 in. of Hg above atmospheric pressure before the rupture-disk to the KEEC-Tank will break. In some cases, the reflux-line 19 already cannot handle this pressure-difference and massflow. Consequently the condenser 16 is already flooded and the cooling-capacity has been reduced. Additionally, the operators want to cool down the batch below 212° F. and pull vacuum. Now the pressure-difference is even higher and flooding of the condenser becomes even more severe (because of the improper design of the reflux-line). At this point you cannot catch the run-away-reaction, because you lost your cooling-capacity and the rupture-disk will break. Therefore, you have to prevent flooding the condenser.

Note for each design of the condenser system, there is a certain maximum pressure-difference to pull. If you exceed this pressure-difference you lose cooling-capacity.

Improved behavior at a run-away-reaction

Figure 34:
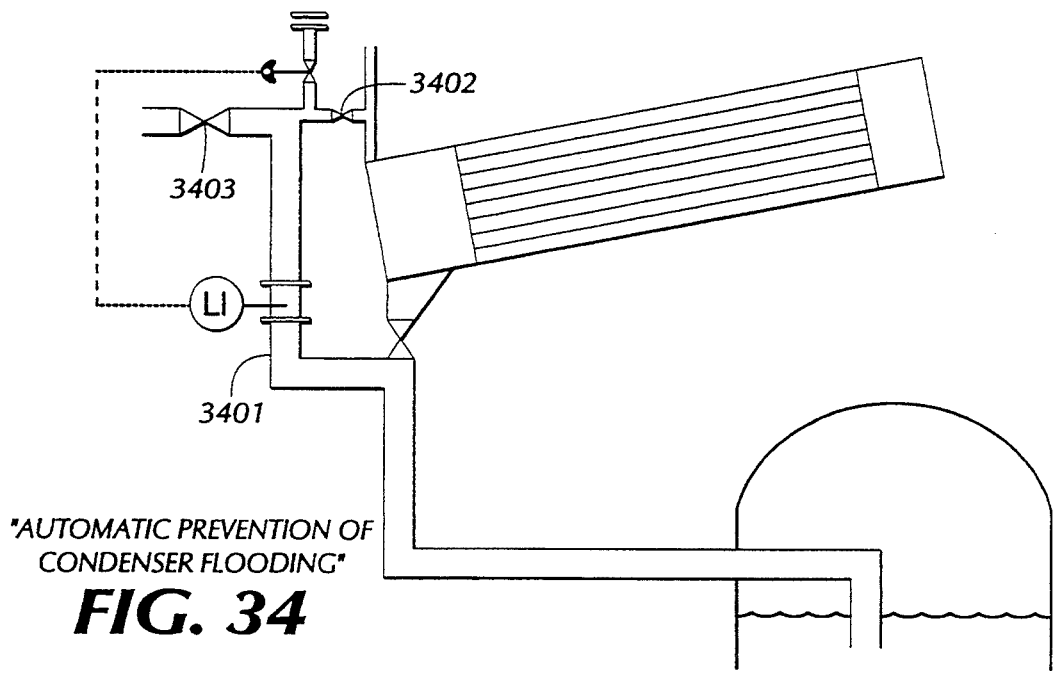
FIG. 34 is a schematic diagram of a means for automatic prevention of condenser flooding in accordance with the present invention.

First of all, the design of the reflux-line 19 needs to be changed and the system needs to be balanced well to hit the flooding-point of the condenser 16 at much higher pressure-difference and higher massflow. To prevent flooding the condenser 16 is the key in this case and there are two ways to do it:

a. Referring now to FIG. 34, an automatic means for prevention of condenser flooding is shown.

Figure 35:
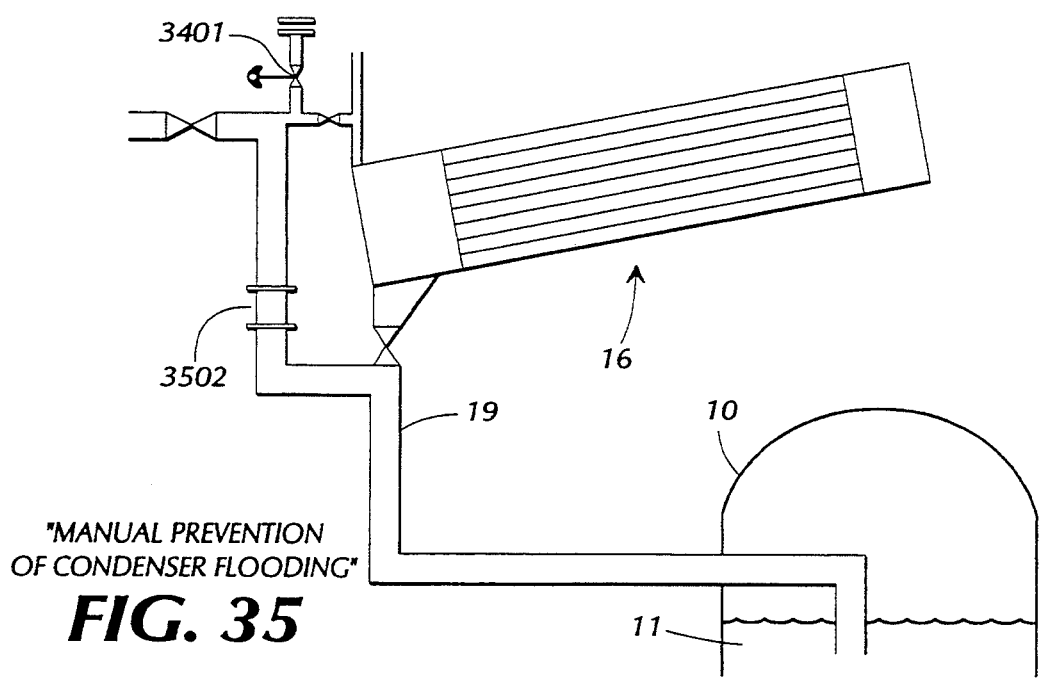
FIG. 35 is a schematic diagram of a means for manual prevention of condenser flooding in accordance with the present invention.

The operators pull vacuum very hard and keep the vacuum. If the level in pipe 3402 rises above a certain height it will be registered and a control-valve 3403 lets some air into the system until the level in pipe 3401 drops down to a certain height. Now the control-valve closes again and the vacuum builds up to this maximum height in the reflux-line 19 where the procedure is started over again.

b. Referring now to FIG. 35, a manual system for prevention of condenser flooding is shown.

The operators are watching sight-glass 3502 and if the liquid-level is rising up in the sight-glass 3502 they start to reduce down the vacuum a little bit until the liquid-level drops down. Now they pull vacuum again until they see the liquid-level rising up again.

In both cases the condenser 16 will not be flooded and the system will still work in this extreme situation with maximum cooling-capacity of the system.

The system needs to be cleaned after any run-away-reaction, even if you catch it before the rupture disk breaks.

It will be understood that the foregoing preferred embodiments are exemplary, and that alternative embodiments can be made without departing from the basic scope of the present invention, which invention is limited solely by the appended claims.

What I claim is:

1. A condenser cooling and temperature control system for condensing the vapor resulting from the processing of a boiling resin batch, comprising:
    (a) an enclosed container for cooking and cooling the resin batch, and including a first opening in said container for receiving a vapor recovery line means and a second opening in said container for receiving a reflux line means;
    (b) a condenser means for condensing the vapor produced during the processing of a boiling resin batch in the container;
    (c) a vapor recovery line means in communication with said first opening and with the condenser means whereby vapor and particles resulting from the processing of the resin batch are permitted to escape from the container and vapor is transported to the condenser means;
    (d) a vacuum pump means and a vacuum line located downstream of said condenser means establishing a pressure differential between said condenser means and said vacuum line whereby the vapor and particles from the processing of the batch are drawn from the container through the vapor recovery line means and through the condenser means;
    (e) a reflux line means for carrying a condensate from the condenser means to the enclosed container, said reflux line means having a positive pressure;
    (f) an entrainment extraction means providing removal of particles from the vapor drawn from the container and introduced into the vapor recover line means, said entrainment extraction means being located upstream of said condenser means;
    (g) a means for determining the pressure differential between the container and the vacuum line; and
    (h) at least one alternative vapor recovery line means for routing vapor and particles resulting from the processing of the batch from said container to said condenser means, and a flow directing means in communication with said alternative vapor recovery line means, wherein said entrainment extraction means is by-passed in response to a reduction of said pressure differential by a predetermined amount.

2. A condenser cooling and temperature control system as claimed in claim 1, further including:
    (i) an entrainment collector means in communication with the entrainment extraction means for collecting entrainment from the entrainment extraction means, wherein said entrainment collector means is in communication with said container to provide for return of the particles extracted from the vapor by the entrainment extraction means to the container.

3. A condenser cooling and temperature control system as claimed in claim 1, wherein said means for determining the pressure differential between the container and the vacuum line includes a means for measurement of pressure at the vacuum line.

4. A condenser cooling and temperature control system as claimed in claim 1, wherein said means for determining the pressure differential between the container and the vacuum line includes a means for measurement of pressure at the container.

5. A condenser cooling and temperature control system as claimed in claim 1, wherein said entrainment extraction means includes a cyclone.

* * * * *

UNITED STATES PATENT AND TRADEMARK OFFICE
CERTIFICATE OF CORRECTION

PATENT NO.   : 5,393,498
DATED        : February 28, 1995
INVENTOR(S)  : Kai Lieberam It is certified that error appears in the above-indentified patent and that said Letters Patent is hereby corrected as shown below:

On the title page: Item [*] Notice
The portion of the term of this patent subsequent to March 28, 2008 has been disclaimed.

Signed and Sealed this

Fourteenth Day of October, 1997

Attest:

BRUCE LEHMAN

Attesting Officer

Commissioner of Patents and Trademarks